(12) United States Patent
Nobutsugu et al.

(10) Patent No.: US 11,555,148 B2
(45) Date of Patent: Jan. 17, 2023

(54) ULTRAVIOLET-EMITTING PHOSPHOR, LIGHT-EMITTING ELEMENT, AND LIGHT-EMITTING DEVICE

(71) Applicant: DYDEN CORPORATION, Fukuoka (JP)

(72) Inventors: Tanamachi Nobutsugu, Fukuoka (JP); Tanno Hiroaki, Fukuoka (JP); Fukushima Tomoko, Fukuoka (JP); Nishihara Terutaka, Fukuoka (JP)

(73) Assignee: DYDEN CORPORATION, Fukuoka (JP)

( * ) Notice: Subject to any disclaimer, the term of this patent is extended or adjusted under 35 U.S.C. 154(b) by 277 days.

(21) Appl. No.: 16/492,732

(22) PCT Filed: Jun. 14, 2018

(86) PCT No.: PCT/JP2018/022791
§ 371 (c)(1),
(2) Date: Sep. 10, 2019

(87) PCT Pub. No.: WO2018/235723
PCT Pub. Date: Dec. 27, 2018

(65) Prior Publication Data
US 2021/0139774 A1    May 13, 2021

(30) Foreign Application Priority Data
Jun. 20, 2017 (JP) ............... JP2017-120547

(51) Int. Cl.
*C09K 11/77* (2006.01)
*C01B 25/45* (2006.01)

(52) U.S. Cl.
CPC .......... *C09K 11/7778* (2013.01); *C01B 25/45* (2013.01); *C09K 11/771* (2013.01); *C09K 11/7709* (2013.01); *C09K 11/7777* (2013.01); *C01P 2002/52* (2013.01); *C01P 2002/72* (2013.01)

(58) Field of Classification Search
CPC .............. C09K 11/7709; C09K 11/771; C09K 11/7777; C09K 11/7778; C09K 11/7795; C01P 2002/52; C01B 25/45; H01J 61/44
USPC .................................................. 252/301.4 P
See application file for complete search history.

(56) References Cited

U.S. PATENT DOCUMENTS

| | | | | |
|---|---|---|---|---|
| 2005/0158224 A1* | 7/2005 | Muller | ...................... | C01B 25/37 423/263 |
| 2006/0138387 A1* | 6/2006 | Fan | ...................... | C09K 11/7777 252/301.4 P |
| 2008/0258601 A1* | 10/2008 | Justel | ................... | C09K 11/778 313/643 |
| 2008/0266861 A1* | 10/2008 | Justel | ................. | C09K 11/7777 313/642 |
| 2014/0196303 A1* | 7/2014 | Wasamoto | ................ | F26B 3/28 34/275 |

FOREIGN PATENT DOCUMENTS

| | | |
|---|---|---|
| CN | 1974718 A | 6/2007 |
| CN | 101160373 A | 4/2008 |
| JP | 49-91084 A | 8/1974 |
| JP | 62-263280 A | 11/1987 |
| JP | 1-126391 A | 5/1989 |
| JP | 2008-500422 A | 1/2008 |
| JP | 2008-536282 A | 9/2008 |
| JP | 2011-175823 A | 9/2011 |
| JP | 2012-048831 A | 3/2012 |
| JP | 2014-129452 A | 7/2014 |
| KR | 10-1416146 B1 | 7/2014 |
| WO | WO 2017/067072 A1 | 4/2017 |

OTHER PUBLICATIONS

Machine translation of JP2012-048831A, 7 pages. (Year: 2012).*
Azves, C. C. et al., Amino acid coupled to Pr3+, doped lanthanum orthophosphate (ZaPO4), nanoparticles, laterials letters, 2014, vol. 137, pp. 435-439.
Rodriguez-Ziviano Sofia et al., bicrowave-Assisted, Synthesis and uminescence o l'esoporous RE-Doped, YPO4 {RE=Eu, Ce, Tb, and Ce+Tb) Nanophosphors with enticular Shape, Crystal Growth & Design, 2012, vol. 12, pp. 635-645.
Iuwang, H. N. et al., Effects of Ce3+Codoping and Annealing on Phase Transformation and uminescence of Eu3+-Doped YPO4 Nanorods: D20 Solvent Effect, Journal of the American Chemical Society, 2010, vol. 132, pp. 2759-2768.
Crauchard, H. et al., Influence du Lithium sur les Proprietes Optiques de L'Orthophosphate de Lanthane Dope avec Eu3+, Tb3+, Ce3+—Tb3+, Materials Research Bulletin, 1989, vol. 24, pp. 1303-1315, ISSN:0025-5408.
International Search Report for PCT/JP2018/022791, dated Oct. 7, 2018, Japan Patent Office, 6 pages.
Trukhin, Anatoly et al. "Ultraviolet luminescence of ScPO4, AlPO4, and GaPO4 Crystals", J. Phys.: Condens. Matter 25 (2013) 385502 (6 pp).
CN 1st Office Action in corresponding CN 201880003346.3 dated May 16, 2022 (9 pages) & English translation (12 pg).

* cited by examiner

Primary Examiner — Matthew E. Hoban
Assistant Examiner — Lynne Edmondson
(74) Attorney, Agent, or Firm — Fay Sharpe LLP

(57) ABSTRACT

An ultraviolet light emitting phosphor for mercury-free lamps is a phosphor composed of a phosphate containing at least two metal elements selected from the group consisting of group 13 elements and lanthanoid series elements, and is excited to emit ultraviolet by irradiation with vacuum ultraviolet rays or an electron beam.

20 Claims, 10 Drawing Sheets

FIG. 4a
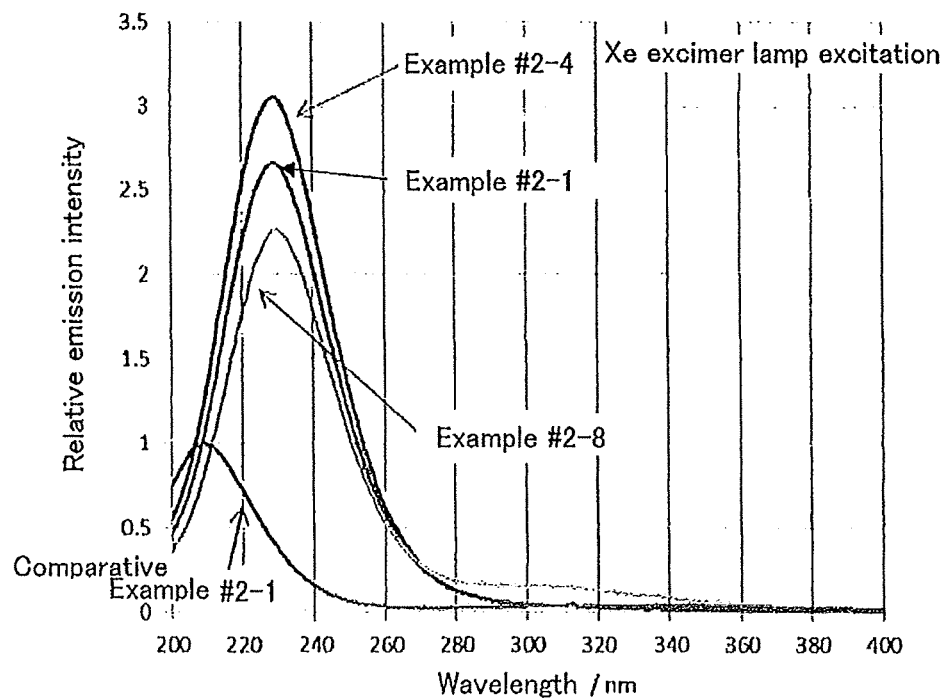
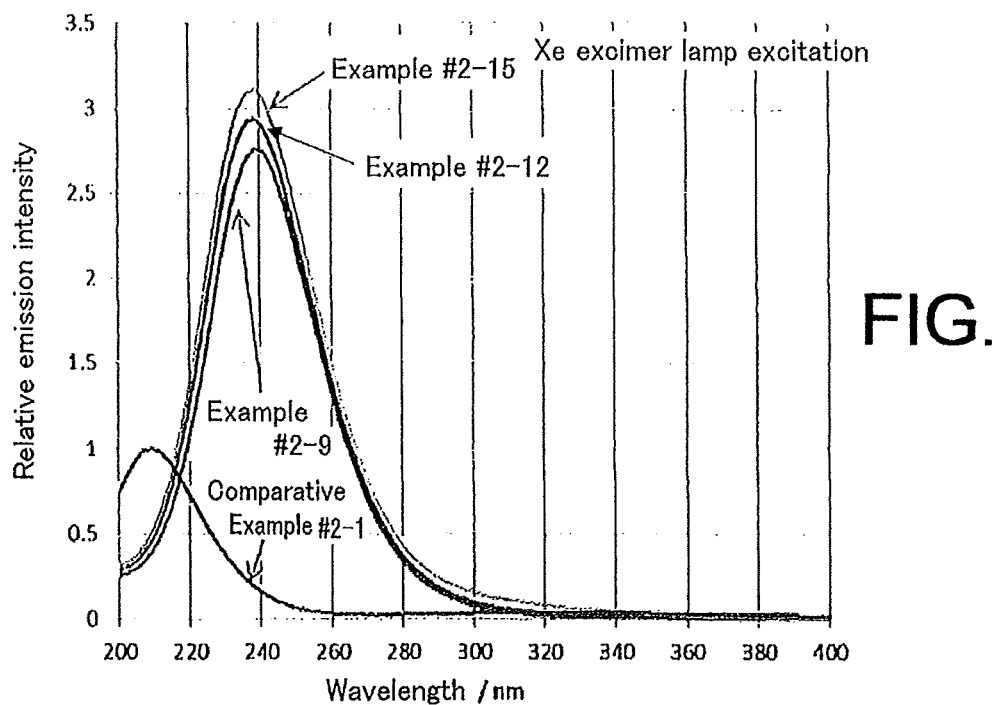
FIG. 4

Example #3-5  $(Lu_{0.95},Nd_{0.05})PO_4$

Example #3-10  $(Lu_{0.90},Nd_{0.05},Al_{0.05})PO_4$

Example #3-13  $(Lu_{0.90},Nd_{0.05},Ga_{0.05})PO_4$

FIG. 9a
Example #5-4  $(La_{0.8}, Ce_{0.2})PO_4$
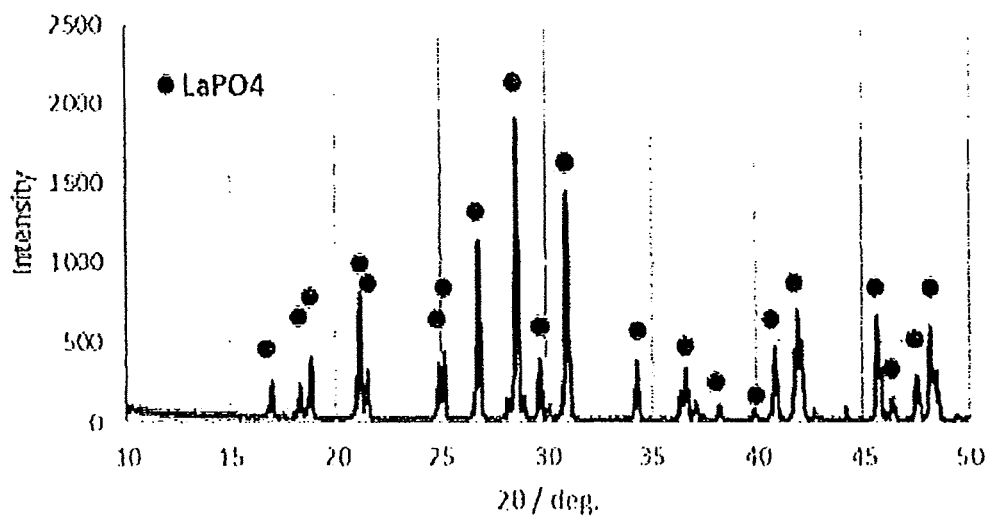
Example #5-10  $(La_{0.7}, Ce_{0.2}, Pr_{0.1})PO_4$
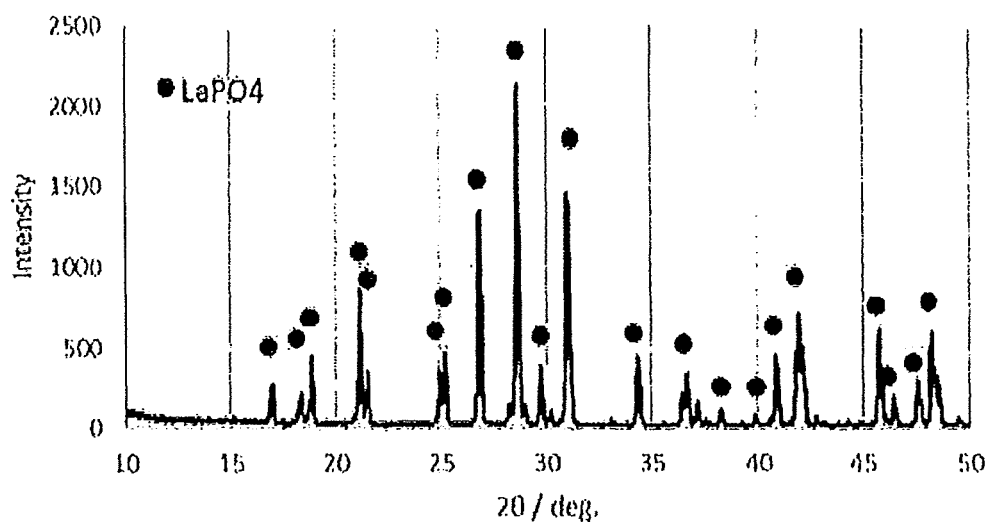
FIG. 9b

`US 11,555,148 B2`

ULTRAVIOLET-EMITTING PHOSPHOR, LIGHT-EMITTING ELEMENT, AND LIGHT-EMITTING DEVICE

CLAIM OF PRIORITY

This application claims priority from PCT application PCT/JP2018/022791, filed on Jun. 14, 2018, which claims priority from Japanese Patent Application No. 2017-120547, filed on Jun. 20, 2017, the entirety of which is hereby incorporated by reference.

TECHNICAL FIELD

The present disclosure relates to an ultraviolet light emitting phosphor that is excited by vacuum ultraviolet rays or electron beam to emit ultraviolet light, particularly an ultraviolet light emitting phosphor for mercury-free lamps.

BACKGROUND OF THE DISCLOSURE

The use of ultraviolet light has expanded in the medical and photocatalyst fields, and the industrial value of ultraviolet light emitting devices has increased. Various phosphors exhibiting ultraviolet light emission have been developed. A mercury lamp is widely used in a phosphor exhibiting ultraviolet light emission, because the mercury lamp has high convenience that, for example, it can be manufactured at low cost and it can exert high energy.

However, the large impact of mercury on the natural environment is currently regarded as problem, and from the viewpoint of environmental protection, legal restrictions prohibiting mercury production will be enforced in the future. On this background, a substitute light source without mercury (mercury-free) has been urgently required to be developed.

Examples of a conventional light source without mercury include a plane light source wherein the first phosphor layer such as $YAlO_3:Ce^{3+}$ inside a vacuum chamber is excited to emit the first light by vacuum ultraviolet rays, the second phosphor layer outside the vacuum chamber is excited to emit the second light by the first light, and thus white light is emitted (refer to Patent Literature 1).

Examples of a phosphor for light sources without mercury include a phosphor for vacuum ultraviolet-excited light-emitting elements that comprises a compound having a spinel type structure represented by a formula $M1O-M2_2O_3$ wherein M1 is one or more selected from the group consisting of Mg, Ca, Sr, Ba, and Zn, and M2 is one or more selected from the group consisting of Sc, Y, B, Al, Ga, and In) containing Ln as an activator (provided that Ln is one or more selected from the group consisting of Ce, Pr, Nd, Sm, Eu, Tb, Ho, Dy, Er, and Tm), the phosphor suppressing the reduction of emission intensity (refer to Patent Literature 2).

As other phosphors for light sources without mercury, an ultraviolet light emitting phosphor composed of phosphates such as $ScPO_4$, $LuPO_4:Nd$, and $LaPO_4:Pr$ has also been known (refer to Non Patent Literatures 1 to 3).

CITATION LIST

Patent Literature

Patent Literature 1: Japanese Patent Laid-Open No. 2009-16268.
Patent Literature 2: Japanese Patent Laid-Open No. 2006-249120.

Non Patent Literature

Non Patent Literature 1: A. Trukhin et al., Materials Science Forum, Vols. 239-241, pp 573-576 (1997).
Non Patent Literature 2: D. Wisniewski et al., Nuclear Instruments and Methods in Physics Research A 486 (2002) 239-243.
Non Patent Literature 3: Thomas Juestel, presentation material of 8th Phosphor Global Summit (2010).

SUMMARY OF THE DISCLOSURE

Technical Problem

Although the present substitute light source of mercury emits ultraviolet by the vacuum ultraviolet excitation as mentioned above, it does not exert sufficient emission intensity in an ultraviolet region particularly suitable for sterilization application. For example, an emission wavelength of a phosphor of Patent Literature 1 has only 370 nm of a peak wavelength of light excited by vacuum ultraviolet rays (the first light), and remains to be a wavelength in near ultraviolet region or blue region. An emission wavelength of a phosphor of Patent Literature 2 remains to be emission in a visible light region. In other words, any ultraviolet light emitting phosphor as a conventional substituent light source of mercury has not reached emitting sufficiently intense ultraviolet light in an ultraviolet region having a wavelength shorter than 310 nm.

Ultraviolet light emitting phosphors comprising phosphates of Non Patent Literatures 1 to 3 still also have low emission intensity, and have not reached practical development for sterilization application and the like under the current circumstances.

The present disclosure has been made to solve the problem. The object of the present disclosure is to provide an ultraviolet light emitting phosphor for a mercury-free lamp (that is, as a light source without requiring mercury) exhibiting ultraviolet light by irradiation with vacuum ultraviolet rays or electron beam.

Solution to Problem

As a result of intensive studies, the present inventors have found that a phosphate containing a certain metal element was synthesized and the phosphate having a previously-unknown particular element blending ratio as a new phosphate phosphor previously unknown emits ultraviolet light having specific and excellent light emission characteristics which do not conventionally exist. The present inventors have found that the above problem can be solved by the phosphor and led to the present disclosure.

More specifically, as an ultraviolet light emitting phosphor disclosed in the present application, a phosphor is provided which is composed of a phosphate containing at least two metal elements selected from the group consisting of group 13 elements and lanthanoid series elements, and which is excited to emit ultraviolet by irradiation with vacuum ultraviolet rays or an electron beam. A light emitting element comprising an ultraviolet light emitting phosphor disclosed in the present application is also provided. A light emitting device comprising the light emitting element is also provided.

Other aspects of the disclosure will become apparent upon a reading and understanding of the following detailed description.

BRIEF DESCRIPTION OF DRAWINGS

FIG. 4a shows the result of emission intensity from vacuum ultraviolet excitation of the phosphor according to Example 2 in the present disclosure.

FIG. 4b shows the result of emission intensity from vacuum ultraviolet excitation of the phosphor according to Example 2 in the present disclosure.

FIG. 9a shows the X-ray diffraction result of the phosphor according to Example 5 in the present disclosure.

FIG. 9b shows the X-ray diffraction result of the phosphor according to Example 5 in the present disclosure.

DETAILED DESCRIPTION OF THE DISCLOSURE

Figure 1A:
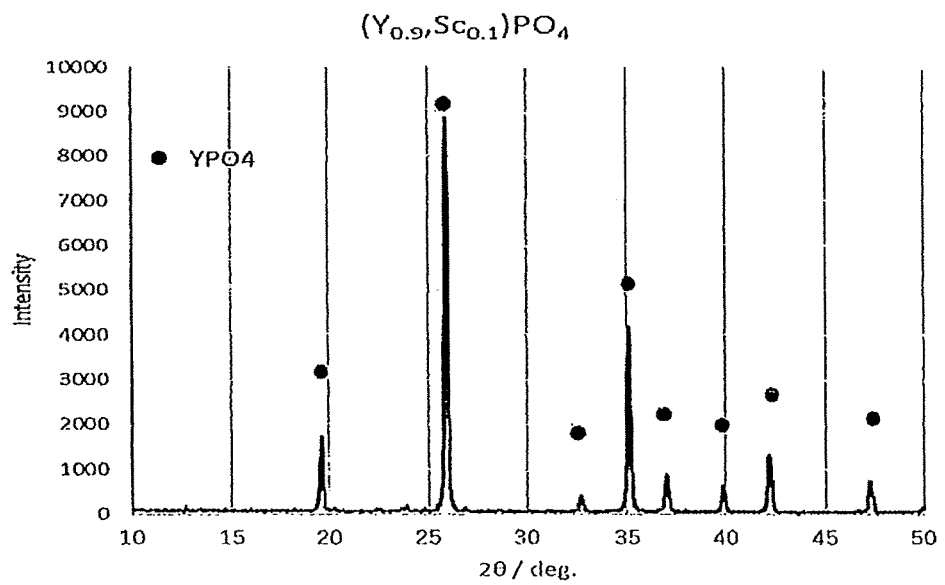
FIG. 1a shows the X-ray diffraction result of the phosphor according to Example 1 in the present disclosure.
Figure 1B:
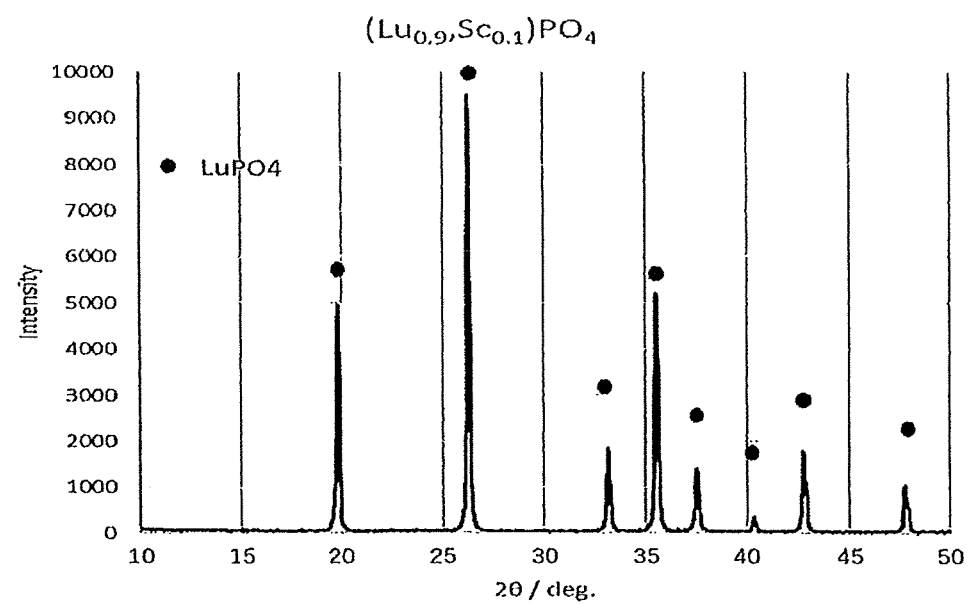
FIG. 1b shows the X-ray diffraction result of the phosphor according to Example 1 in the present disclosure.
Figure 2A:
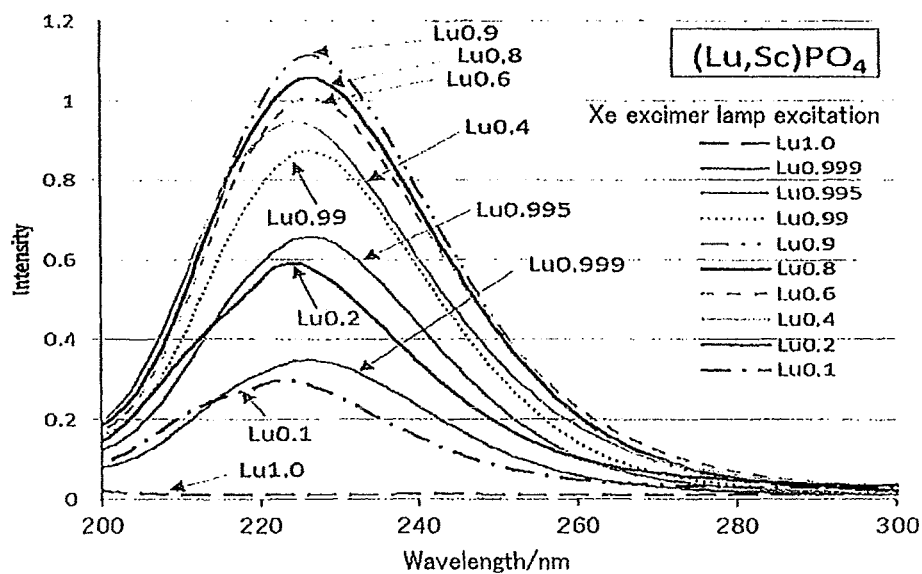
FIG. 2a shows the result of emission intensity from vacuum ultraviolet excitation of the phosphor according to Example 1 in the present disclosure.
Figure 2B:
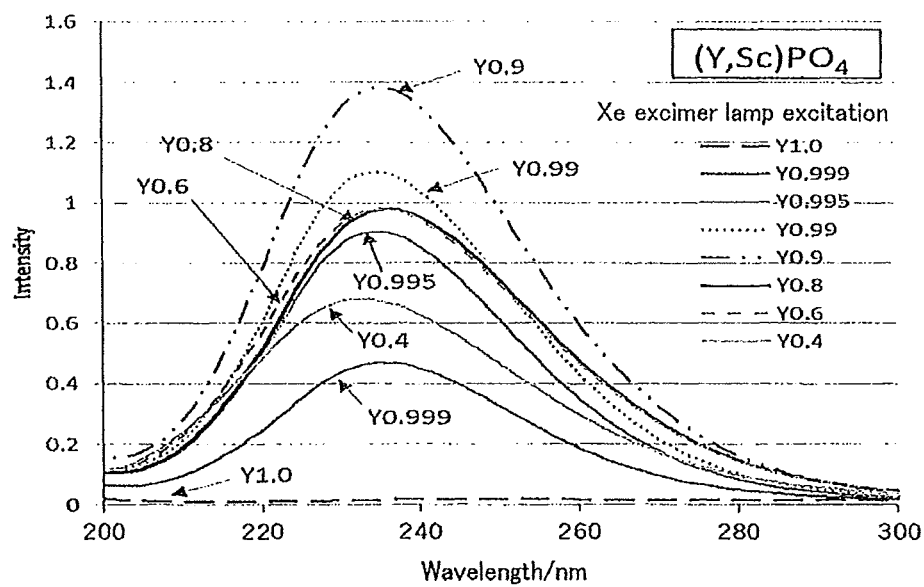
FIG. 2b shows the result of emission intensity from vacuum ultraviolet excitation of the phosphor according to Example 1 in the present disclosure.
Figure 3A:
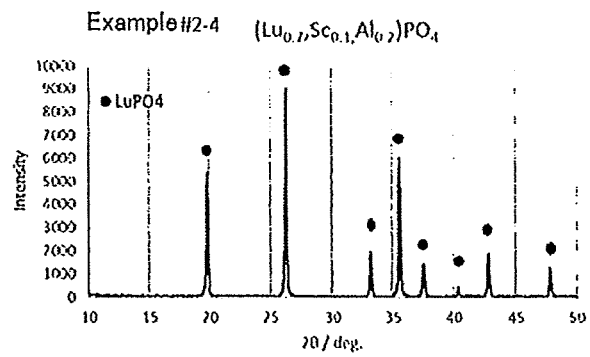
FIG. 3a shows the X-ray diffraction result of the phosphor according to Example 2-4 in the present disclosure.
Figure 3B:
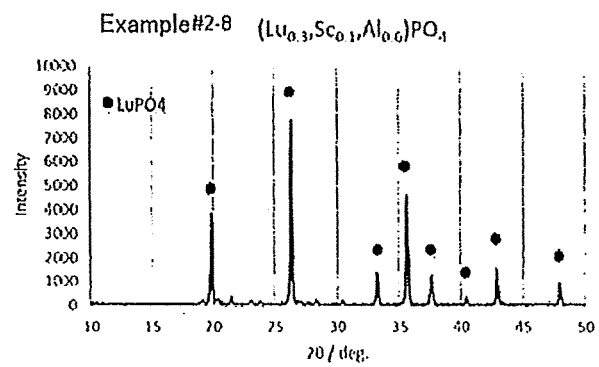
FIG. 3b shows the X-ray diffraction result of the phosphor according to Example 2-8 in the present disclosure.
Figure 3C:
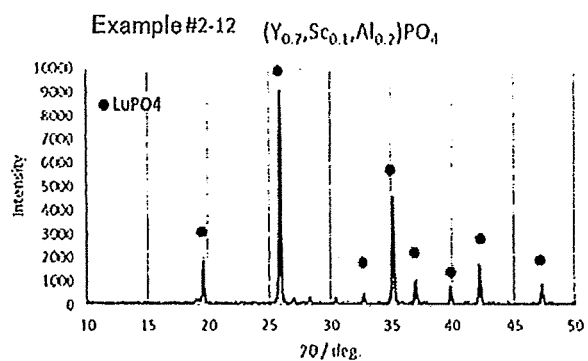
FIG. 3c shows the X-ray diffraction result of the phosphor according to Example 2-12 in the present disclosure.
Figure 3D:
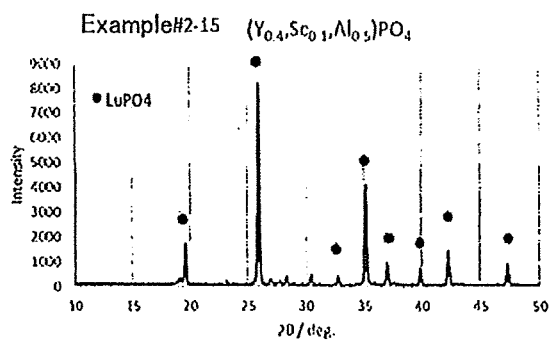
FIG. 3d shows the X-ray diffraction result of the phosphor according to Example 2-15 in the present disclosure.

An ultraviolet light emitting phosphor disclosed in the present application is, as described above, a phosphor composed of a phosphate containing at least two metal elements selected from the group consisting of group 13 elements and lanthanoid series elements, and the phosphor is excited to emit ultraviolet by irradiation with vacuum ultraviolet rays or electron beam.

Group 13 elements and lanthanoid series elements are defined in IUPAC periodic tables. As for at least two metal elements, at least one metal element can be selected from group 13 elements and at least one metal element can be selected from lanthanoid series elements. Also, at least two metal elements can be selected from only group 13 elements. In addition to this, at least two metal elements can be selected from only lanthanoid series elements.

Group 13 elements are not particularly limited, but preferably include an aluminum element (Al), a gallium element (Ga), and an indium element (In).

Lanthanoid series elements are not particularly limited, but preferably include a scandium element (Sc), an yttrium element (Y), a lanthanum element (La), a cerium element (Ce), a praseodymium element (Pr), a neodymium element (Nd), and a lutetium element (Lu). The blending molar ratio is not particularly limited, but is preferably 0.999 or less, more preferably 0.995 or less, from the viewpoint of obtaining higher emission intensity.

The presence or absence of an activator as a light emitting source is not particularly limited. For example, an example of a phosphor without an activator includes LuPO4 wherein a part of a lutetium element (Lu) site is substituted by a metal element selected from the group consisting of an aluminum element (Al), a gallium element (Ga), an indium element (In), a scandium element (Sc), an yttrium element (Y), and a lanthanum element (La). Its emission wavelength characteristics are suitable for applications of organic matter decomposition, ozone generation, OH radical generation, Low-k insulating film formation, and sterilization and pasteurization.

The phosphor disclosed in the present application is more preferably represented by a general formula $(M1)_{1-x}(M2)_xPO4$ wherein M1 is at least one metal element selected from the group consisting of an aluminum element (Al), a gallium element (Ga), an indium element (In), an yttrium element (Y), a lanthanum element (La), and a lutetium element (Lu); M2 is a scandium element (Sc) at a raw material mole fraction of 0.005 to 0.80, a neodymium element (Nd) at a raw material mole fraction of 0.005 to 0.10, a praseodymium element (Pr) at a raw material mole fraction of 0.005 to 0.20, or a cerium element (Ce) at a raw material mole fraction of 0.05 to 0.50 which may contain a praseodymium element (Pr) at a raw material mole fraction of 0.005 to 0.50.

When a scandium element (Sc) at a raw material mole fraction of 0.005 to 0.80 is used as M2, an example of a phosphor includes an ultraviolet light emitting phosphor at least comprising a scandium element (Sc) at a raw material mole fraction of 0.005 to 0.80, a lutetium element (Lu), and a phosphate ion, the phosphor excited to emit ultraviolet by irradiation with vacuum ultraviolet rays or electron beam. An example is a phosphor represented by a general formula $(Lu, Y, Al, Ga)_{1-x}PO4:Sc_x$ (where $0.005 \leq x \leq 0.80$). Furthermore, an aluminum element (Al) and a gallium element (Ga) are preferably at a combined raw material mole fraction of 0 to 0.6, and the phosphor can be suitably represented by a general formula ((Lu, Y)1-x-y(Al, Ga)y)PO4:Scx ($0.005 \leq x \leq 0.80$, $0 \leq y \leq 0.6$).

When a neodymium element (Nd) at a raw material mole fraction of 0.005 to 0.10 is used as M2, an example of a phosphor includes an ultraviolet light emitting phosphor at least comprising a neodymium element (Nd) at a raw material mole fraction of 0.005 to 0.10, a lutetium element (Lu), and a phosphate ion, the phosphor excited to emit ultraviolet by irradiation with vacuum ultraviolet rays or electron beam. An example of the phosphor includes LuPO4:Nd wherein a part of a lutetium element (Lu) site is substituted by an aluminum element (Al), a gallium element (Ga), an indium element (In), a scandium element (Sc), an yttrium element (Y), and a lanthanum element (La). Its emission wavelength characteristics in a slightly narrow ultraviolet region are suitable for applications of organic matter decomposition, ozone generation, OH radical generation, Low-k insulating film formation, and sterilization and pasteurization.

An example of a phosphor according to the present embodiment thus includes a phosphor represented by a general formula (Lu, Al, Ga)1-xPO4:Ndx ($0.005 \leq x \leq 0.10$). Furthermore, an aluminum element (Al) and a gallium element (Ga) are preferably at a combined raw material mole fraction of 0 to 0.1, and an example is a phosphor suitably represented by a general formula Lu1-x-y(Al, Ga)yPO4:Ndx ($0.005 \leq x \leq 0.10$, $0 \leq y \leq 0.10$). An example is a phosphor represented by a general formula Lu1-xPO4:Ndx ($0.005 \leq x \leq 0.10$).

An example of a phosphor according to the present embodiment includes LaPO4:Pr wherein a part of a lanthanum element (La) site is substituted by an aluminum element (Al), a gallium element (Ga), an indium element (In), a scandium element (Sc), an yttrium element (Y), and a lutetium element (Lu). Its emission wavelength characteristics are suitable for applications of organic matter decomposition, ozone generation, OH radical generation, Low-k insulating film formation, and sterilization and pasteurization.

Thus, when a praseodymium element (Pr) at a raw material mole fraction of 0.005 to 0.20 is used as M2, an example of a phosphor includes an ultraviolet light emitting phosphor at least comprising a praseodymium element at a raw material mole fraction of 0.005 to 0.20, a lanthanum element (La), and a phosphate ion, the phosphor excited to emit ultraviolet by irradiation with vacuum ultraviolet rays or electron beam. An example is a phosphor represented by a general formula (La, Lu, Y, Al, Ga)1-xPO4:Prx ($0.005 \leq x \leq 0.20$). Furthermore, a lutetium element (Lu) and an aluminum element (Al) preferably have raw material compositions having molar ratios of 0 to 0.1, an aluminum element (Al) and a gallium element (Ga) preferably have raw material compositions having molar ratios of 0 to 0.1, and the phosphor can be suitably represented by a general formula (La1-x-y-z(Lu, Y)y(Al, Ga)z)PO4:Prx ($0.005 \leq x \leq 0.2$, $0 \leq y \leq 0.1$, $0 \leq z \leq 0.05$). An example is a phosphor represented by a general formula La1-xPO4:Prx ($0.005 \leq x \leq 0.20$).

When a cerium element (Ce) at a raw material mole fraction of 0.05 to 0.50 is used as M2, M2 may contain a praseodymium element (Pr) at a raw material mole fraction of 0.005 to 0.50. Therefore, example of such a phosphor includes an ultraviolet light emitting phosphor at least comprising a cerium element (Ce) at a raw material mole fraction of 0.05 to 0.50, which may contain a praseodymium element (Pr) at a raw material mole fraction of 0.005 to 0.50, a lanthanum element (La), and a phosphate ion, the phosphor excited to emit ultraviolet by irradiation with vacuum ultraviolet rays or electron beam.

Such a phosphor can be represented by a general formula La1-xPO4:Cex ($0.05 \leq x \leq 0.50$) for example, when M2 is a cerium element (Ce) at a raw material mole fraction of 0.05 to 0.50. More preferably, this phosphor contains a cerium element (Ce) and a praseodymium element (Pr), and can be represented by a general formula La1-x-yPO4:CexPry ($0.05 \leq x \leq 0.50$, $0.05 \leq y \leq 0.50$), for example.

With respect to an phosphor additionally containing another element in the phosphor of the present embodiment (for example, a phosphor containing an aluminum element (Al) and the like in a general formula La1-x-yPO4:CexPry ($0.05 \leq x \leq 0.50$, $0.05 \leq y \leq 0.50$), this phosphor is equivalent to the phosphor of the present embodiment and included in the phosphor of the present embodiment, as long as the phosphor exerts the same effect as the phosphor of the present embodiment essentially has (refer to Examples described below).

An excitation source of the ultraviolet light emitting phosphor according to the present application is not particularly limited as long as it is a light source capable of emitting vacuum ultraviolet rays having 200 nm or less of excitation wavelength or electron beam. For example, when vacuum ultraviolet rays are used as an excitation source, an excimer lamp or heavy hydrogen lamp, which has been conventionally and widely utilized, can be used as it is. For example, a krypton (Kr) excimer lamp (147 nm of wavelength), a xenon (Xe) excimer lamp (172 nm of wavelength), a heavy hydrogen lamp (160 nm of wavelength), and a heavy hydrogen lamp (185 nm of wavelength) can be used.

Through irradiation from these excitation sources, the ultraviolet light emitting phosphor disclosed in the present application can emit ultraviolet of various ultraviolet regions such as ultraviolet lights of 190 nm to 340 nm ultraviolet regions (DUV, UV-A, and UV-B), which are useful for various applications. It was confirmed that the ultraviolet light emitting phosphor disclosed in the present application emitted more intensive ultraviolet light than conventional phosphors in 190 nm to 340 nm emission peak regions, which are useful for various applications, of ultraviolet regions (refer to Examples described below). On the other hand, it was also confirmed that a phosphate having only one metal element, which has been conventionally known, did not exhibit sufficient emission intensity.

Although the mechanism that the ultraviolet light emitting phosphor according to the present application exhibits such an excellent effect has not yet been clarified in detail, it is assumed that some structural factor is inherent to the phosphor which specifically enhances the light emission effect by at least two metal elements being present at a particular ratio in a phosphate irradiated with vacuum ultraviolet rays or electron beam, the metal elements selected from the group consisting of group 13 elements and lanthanoid series elements. More specifically, it is assumed that irradiation with vacuum ultraviolet rays or electron beam may induce suitable interaction between distances among the atoms constituting the phosphor and the wavelength of vacuum ultraviolet rays or electron beam, resulting in easy atomic-level transfer of the light energy in the ultraviolet region to an energy level capable of specific emission.

An example of a method for manufacturing such ultraviolet light emitting phosphors disclosed in the present application is to use oxides of each constituent element as raw materials and mix these oxides at a stoichiometric ratio so as to be a desired phosphor composition. For example, as an example of the ultraviolet light emitting phosphor according to the present application, scandium oxide (Sc2O3), lutetium oxide (Lu2O3), and diammonium hydrogenphosphate ((NH4)2HPO4) can be used as raw material to obtain (Lu, Sc)PO4 wherein a part of Lu site of LuPO4 is substituted with Sc.

Each powder is mixed, and the mixture is subjected to high temperature calcination under atmosphere to obtain a desired phosphor. In this case, a halogenide of an alkali metal or an alkali earth metal, for example, may be added as a reaction accelerator. This high temperature calcination can be performed at 2 steps, for example. For example, calcination is performed at a temperature of 800° C. to 1600° C. for 1 to 10 hours under atmosphere. After the high temperature calcination, cracking is performed, and calcination can be performed at a temperature of 800° C. to 1600° C. for 1 to 10 hours under reducing atmosphere to obtain a desired phosphor as a sintered body.

An ultraviolet light emitting phosphor thus obtained can emit 190 to 340 nm ultraviolet light and is used for a wide variety of applications. This ultraviolet light with 190 nm or more has the advantage of small absorption by water and deep penetration in water, due to a significant difference between the wavelength and the size of water molecules.

Examples of the applications include a light source for the fields of Low-k insulating film formation, OH radical generation, ozone generation, organic matter decomposition, sterilization, pasteurization, and resin curing. For example, sterilization of the various object to be sterilized using ultraviolet light emitted from the ultraviolet light emitting phosphor according to the present application can provide clean sterilization that suppresses a residue and environmental damage from ultraviolet light.

A sterilization lamp comprising the ultraviolet light emitting phosphor according to the present application is mercury-free and exhibits high sterilization capacity. In addition, use of this ultraviolet light enables decomposition of persistent substances (for example, formaldehyde and PCB) or synthesis of new chemical substances (for example, photocatalyst substance). This ultraviolet light can also be applied to various medical fields such as hospital infection prevention.

Examples are shown below to further demonstrate the characteristics of the present disclosure, but the present disclosure is not limited to these Examples.

(Example 1) (FIGS. 1a, 1b, 2a, 2b)

(1) Manufacturing a Phosphor

As Example 1 (Example 1-1 to Example 1-8), an yttrium oxide ($Y_2O_3$), a scandium oxide (Sc2O3), and a diammonium hydrogenphosphate ((NH4)2HPO4) were used as raw materials; a lithium fluoride (LiF) was added as a flux; these substances were mixed at a stoichiometric ratio so as to be a composition formula represented by $(Y_{1-x}Sc_x)PO_4$; and for the blending molar ratio x of a scandium element, 8 samples were obtained at x=0, 0.001, 0.005, 0.01, 0.1, 0.2, 0.4, and 0.6.

As Example 1 (Example 1-9 to Example 1-18), a lutetium oxide (Lu2O3), a scandium oxide (Sc2O3), and a diammonium hydrogenphosphate ((NH4)2HPO4) were used as raw materials; a lithium fluoride (LiF) was added as a flux; these substances were mixed at a stoichiometric ratio so as to be a composition formula represented by $(Lu_{1-x}Sc_x)PO_4$; and for the blending molar ratio x of a scandium element, 10 samples were obtained at x=0, 0.001, 0.005, 0.01, 0.1, 0.2, 0.4, 0.6, 0.8, and 0.9.

The compositions of these raw materials are shown in detail below.

TABLE 1

| | | Composition | | | | Measured value | | | | |
|---|---|---|---|---|---|---|---|---|---|---|
| | | Y mol | Lu mol | Sc mol | P mol | $Y_2O_3$ g | $Lu_2O_3$ g | $SC_2O_3$ g | $(NH_4)_2HPO_4$ g | LiF g |
| Example | #1-1 | 1 | — | 0 | 1 | 9.0777 | — | — | 10.8912 | 0.4154 |
| | #1-2 | 0.999 | — | 0.001 | 1 | 9.0687 | — | 0.0055 | 10.8912 | 0.4154 |
| | #1-3 | 0.995 | — | 0.005 | 1 | 9.0324 | — | 0.0277 | 10.8912 | 0.4154 |
| | #1-4 | 0.99 | — | 0.01 | 1 | 8.9870 | — | 0.0554 | 10.8912 | 0.4154 |
| | #1-5 | 0.9 | — | 0.1 | 1 | 8.1700 | — | 0.5545 | 10.8912 | 0.4154 |
| | #1-6 | 0.8 | — | 0.2 | 1 | 7.2622 | — | 1.1089 | 10.8912 | 0.4154 |
| | #1-7 | 0.6 | — | 0.4 | 1 | 5.4466 | — | 2.2179 | 10.8912 | 0.4154 |
| | #1-8 | 0.4 | — | 0.6 | 1 | 3.6311 | — | 3.3268 | 10.8912 | 0.4154 |
| | #1-9 | — | 1 | 0 | 1 | — | 13.9569 | — | 9.5298 | 0.3635 |
| | #1-10 | — | 0.999 | 0.001 | 1 | — | 13.9430 | 0.0049 | 9.5298 | 0.3635 |
| | #1-11 | — | 0.995 | 0.005 | 1 | — | 13.8871 | 0.0243 | 9.5298 | 0.3635 |
| | #1-12 | — | 0.99 | 0.01 | 1 | — | 13.8174 | 0.0485 | 9.5298 | 0.3635 |
| | #1-13 | — | 0.9 | 0.1 | 1 | — | 12.5612 | 0.4852 | 9.5298 | 0.3635 |
| | #1-14 | — | 0.8 | 0.2 | 1 | — | 11.1655 | 0.9703 | 9.5298 | 0.3635 |
| | #1-15 | — | 0.6 | 0.4 | 1 | — | 8.3742 | 1.9406 | 9.5298 | 0.3635 |
| | #1-16 | — | 0.4 | 0.6 | 1 | — | 5.5828 | 2.9110 | 9.5298 | 0.3635 |
| | #1-17 | — | 0.2 | 0.8 | 1 | — | 2.7914 | 3.8813 | 9.5298 | 0.3635 |
| | #1-18 | — | 0.1 | 0.9 | 1 | — | 1.3957 | 4.3664 | 9.5298 | 0.3635 |

These raw materials were mixed using a mortar for 30 minutes, and then the mixture was filled in an alumina crucible. Calcination was performed at 1000° C. for 2 hours under atmosphere. After calcination, the obtained mixture was grinded using the mortar, washed with pure water, and then dried to obtain a phosphor.

(2) Identification of Phosphors

X-ray diffraction result of the above-obtained sintered body was obtained by an X-ray diffractometer having a radiation source of CuKα. X-ray diffraction results of (Y0.9Sc0.1)PO4 and (Lu0.9Sc0.1)PO4 of the above-obtained phosphor samples are shown in FIGS. 1 (a) and (b). From the obtained peak values, it was confirmed that any sample was definitely crystallized at compositions of $(Y_{1-x}Sc_x)PO_4$ and $(Lu_{1-x}Sc_x)PO_4$.

(3) Measurement of Emission Intensity

With respect to phosphor samples of (Y1-xScx) PO4 obtained in Example 1-1 to Example 1-8, the emission intensity from vacuum ultraviolet excitation by a Xe excimer lamp (wavelength λ=172 nm) was checked. The obtained result is shown in the table below and FIG. 2 (a). With respect to phosphor samples of (Lu1-xScx) PO4 obtained in Example 1-9 to Example 1-18, the emission intensity from vacuum ultraviolet excitation by a Xe excimer lamp (wavelength λ=172 nm) was checked. The obtained result is shown in the table below and FIG. 2 (b). The numerical value of each peak intensity in the table below is reduced one based on the numerical value of the peak intensity in Example 1-18 set at the standard value 100.

TABLE 2

|  |  | Y mol | Lu mol | Sc mol | Peak wavelength nm | |Peak intensity % |
|---|---|---|---|---|---|---|
| Example | #1-1 | 1.000 | — | 0.000 | No emission | No emission |
|  | #1-2 | 0.999 | — | 0.001 | 235.1 | 158.1 |
|  | #1-3 | 0.995 | — | 0.005 | 234.3 | 304.4 |
|  | #1-4 | 0.990 | — | 0.010 | 235.1 | 370.4 |
|  | #1-5 | 0.900 | — | 0.100 | 235.1 | 465.1 |
|  | #1-6 | 0.800 | — | 0.200 | 235.9 | 329.8 |
|  | #1-7 | 0.600 | — | 0.400 | 235.9 | 329.2 |
|  | #1-8 | 0.400 | — | 0.600 | 233.6 | 229.1 |
|  | #1-9 | — | 1.000 | 0.000 | No emission | No emission |
|  | #1-10 | — | 0.999 | 0.001 | 226.7 | 175.6 |
|  | #1-11 | — | 0.995 | 0.005 | 225.9 | 221.2 |
|  | #1-12 | — | 0.990 | 0.010 | 225.9 | 294.2 |
|  | #1-13 | — | 0.900 | 0.100 | 226.7 | 375.0 |
|  | #1-14 | — | 0.800 | 0.200 | 226.7 | 355.7 |
|  | #1-15 | — | 0.600 | 0.400 | 226.7 | 338.7 |
|  | #1-16 | — | 0.400 | 0.600 | 224.4 | 319.0 |
|  | #1-17 | — | 0.200 | 0.800 | 223.6 | 198.6 |
|  | #1-18 | — | 0.100 | 0.900 | 223.6 | 100.0 |

From the obtained result, it was confirmed that light of 224 nm to 236 nm peak wavelength in a deep ultraviolet region was obtained by vacuum ultraviolet excitation. As particularly shown in Example 1-2 to Example 1-8 and Example 1-10 to Example 1-18, extremely intensive light emission was confirmed from the phosphor composed of the phosphate containing at least two metal elements selected from the group consisting of group 13 elements and lanthanoid series elements. On the other hand, as shown in Example 1-1 and Example 1-9, no light emission was obtained from the phosphor composed of the phosphate containing only one metal element. From these results, it was confirmed that inclusion of at least one more of the above metal elements at a particular proportion in the non-light-emitting original phosphor composed of the phosphate containing a single metal element provides more intensive light emission as compared with the conventional phosphors.

From the viewpoint of obtaining more intensive emission intensity, it was confirmed that blending molar ratios of lanthanoid series elements (i.e., an yttrium element (Y) or a lutetium element (Lu)) were preferably 0.999 or less, more preferably 0.995 or less. From the light emission wavelength characteristics of the obtained ultraviolet light, it was confirmed that the phosphors of Example 1 can be applied to applications of organic matter decomposition, ozone generation, OH radical generation, Low-k insulating film formation, and sterilization and pasteurization, and can be utilized as an excellent mercury-free lamp.

(Example 2) (FIGS. 3a, 3b, 3c, 3d, 4a, 4b)

(1) Manufacturing Phosphors

As Example 2 (Example 2-1 to Example 2-15), a lutetium oxide (Lu2O3), an yttrium oxide ($Y_2O_3$), a scandium oxide (Sc2O3), a diammonium hydrogenphosphate ((NH4)2HPO4), an aluminum oxide ($Al_2O_3$), and a gallium oxide (Ga2O3) were used as raw materials, and a lithium fluoride (LiF) was used as a flux. Each substance was taken at a weight described in the table below and mixed using a mortar for 30 minutes, and then the mixture was filled in an alumina crucible. Calcination was performed at 1000° C. for 2 hours under atmosphere. After calcination, the obtained mixture was grinded using the mortar, washed with pure water, and then dried to obtain a phosphor.

As Comparative Example 2 (Comparative Example 2-1), a scandium oxide (Sc2O3) and a diammonium hydrogenphosphate ((NH4)2HPO4) were used as raw materials. Each raw material was taken at a weight described in the table below and mixed using the mortar for 30 minutes, and then the mixture was filled in the alumina crucible. Calcination was performed at 1300° C. for 2 hours under atmosphere. After calcination, the obtained mixture was grinded using the mortar, washed with pure water, and then dried to obtain a phosphor.

The compositions of these raw materials are shown in detail below.

TABLE 3

|  |  |  | Measured value | | | | | |
|---|---|---|---|---|---|---|---|---|
|  |  | Composition | Lu2O3 g | Y2O3 g | Sc2O3 g | Al2O3 g | (NH4)2HPO4 g | LiF g |
| Example | #2-1 | $(Lu_{0.90}Sc_{0.10})PO_4$ | 12.5612 | — | 0.4852 | — | 9.5298 | 1.0905 |
|  | #2-2 | $(Lu_{0.85}Sc_{0.10}Al_{0.05})PO_4$ | 11.8634 | — | 0.4852 | 0.1788 | 9.5298 | 1.0905 |
|  | #2-3 | $(Lu_{0.80}Sc_{0.10}Al_{0.10})PO_4$ | 11.1655 | — | 0.4852 | 0.3576 | 9.5298 | 1.0905 |
|  | #2-4 | $(Lu_{0.70}Sc_{0.10}Al_{0.20})PO_4$ | 9.7699 | — | 0.4852 | 0.7152 | 9.5298 | 1.0905 |
|  | #2-5 | $(Lu_{0.60}Sc_{0.10}Al_{0.30})PO_4$ | 8.3742 | — | 0.4852 | 1.0728 | 9.5298 | 1.0905 |
|  | #2-6 | $(Lu_{0.50}Sc_{0.10}Al_{0.40})PO_4$ | 6.9785 | — | 0.4852 | 1.4305 | 9.5298 | 1.0905 |
|  | #2-7 | $(Lu_{0.40}Sc_{0.10}Al_{0.50})PO_4$ | 5.5828 | — | 0.4852 | 1.7881 | 9.5298 | 1.0905 |
|  | #2-8 | $(Lu_{0.30}Sc_{0.10}Al_{0.60})PO_4$ | 4.1871 | — | 0.4852 | 2.1457 | 9.5298 | 1.0905 |
|  | #2-9 | $(Y_{0.80}Sc_{0.10})PO_4$ | — | 7.1487 | 0.4852 | — | 9.5298 | 1.0905 |
|  | #2-10 | $(Y_{0.85}Sc_{0.10}Al_{0.05})PO_4$ | — | 6.7516 | 0.4852 | 0.1788 | 9.5298 | 1.0905 |
|  | #2-11 | $(Y_{0.80}Sc_{0.10}Al_{0.10})PO_4$ | — | 6.3544 | 0.4852 | 0.3576 | 9.5298 | 1.0905 |
|  | #2-12 | $(Y_{0.70}Sc_{0.10}Al_{0.20})PO_4$ | — | 5.5601 | 0.4852 | 0.7152 | 9.5298 | 1.0905 |
|  | #2-13 | $(Y_{0.60}Sc_{0.10}Al_{0.30})PO_4$ | — | 4.7658 | 0.4852 | 1.0728 | 9.5298 | 1.0905 |
|  | #2-14 | $(Y_{0.50}Sc_{0.10}Al_{0.40})PO_4$ | — | 3.9715 | 0.4852 | 1.4305 | 9.5298 | 1.0905 |
|  | #2-15 | $(Y_{0.40}Sc_{0.10}Al_{0.50})PO_4$ | — | 3.1772 | 0.4852 | 1.7881 | 9.5298 | 1.0905 |
| Comparative Example | #2-1 | $ScPO_4$ | — | — | 5.5447 | — | 10.8912 | — |

(2) Identification of Phosphors

X-ray diffraction result of the above-obtained phosphor was obtained by an X-ray diffractometer having a radiation source of CuKα. X-ray diffraction results of (Lu0.70Sc0.10Al0.20)PO4, (Lu0.30Sc0.10Al0.60)PO4, (Y0.70Sc0.10Al0.20)PO4 and (Y0.40Sc0.10Al0.50)PO4 of the above-obtained phosphor samples are shown in FIGS. 3(a) to (d). From the obtained X-ray diffraction pattern, it was confirmed that any sample was definitely crystallized at compositions of a general formula (Lu, Y, Al, Ga)1-xPO4: Scx (0.005≤x≤0.80).

(3) Measurement of Emission Intensity

With respect to phosphor samples having compositions of (Lu, Y, Al, Ga)1-xPO4:Scx (0.005≤x≤0.80) obtained in Example 2-1 to Example 2-15, the emission intensity from vacuum ultraviolet excitation by a Xe excimer lamp (wavelength λ=172 nm) was checked with Comparative Example 2-1. The obtained results are shown in the table below, and some emission spectrums are shown in FIGS. 4(a) and (b). The numerical value of each peak intensity in the table below is reduced one based on the numerical value of the peak intensity in Comparative Example 2-1 set at the standard value 100.

From the light emission wavelength characteristics of the obtained ultraviolet light, it was confirmed that the phosphors of Example 2 can be applied to applications of organic matter decomposition, ozone generation, OH radical generation, Low-k insulating film formation, resin curing, and sterilization and pasteurization, and can be utilized as an excellent mercury-free lamp.

(Example 3) (FIGS. 5a, 5b, 5c, 6)

(1) Manufacturing a Phosphor

As Example 3 (Example 3-1 to Example 3-11), a lutetium oxide (Lu2O3), a neodymium oxide (Nd2O3), a diammonium hydrogenphosphate ((NH4)2HPO4), and an aluminum oxide ($Al_2O_3$) were used as raw materials, and a lithium fluoride (LiF) was used as a flux. Each substance was taken at a weight described in the table below and mixed using a mortar for 30 minutes, and then the mixture was filled in an alumina crucible. Calcination was performed at 1000° C. for 2 hours under atmosphere. After calcination, the obtained mixture was grinded using the mortar, washed with pure water, and then dried to obtain a phosphor.

TABLE 4

|  |  | Composition | Emission peak wavelength nm | Emission peak intensity % |
|---|---|---|---|---|
| Example | #2-1 | $(Lu_{0.90}Sc_{0.10})PO_4$ | 228.5 | 246.3 |
|  | #2-2 | $(Lu_{0.85}Sc_{0.10}Al_{0.05})PO_4$ | 229.3 | 276.7 |
|  | #2-3 | $(Lu_{0.80}Sc_{0.10}Al_{0.10})PO_4$ | 230.1 | 260.0 |
|  | #2-4 | $(Lu_{0.70}Sc_{0.10}Al_{0.20})PO_4$ | 229.3 | 282.3 |
|  | #2-5 | $(Lu_{0.60}Sc_{0.10}Al_{0.30})PO_4$ | 230.9 | 243.7 |
|  | #2-6 | $(Lu_{0.50}Sc_{0.10}Al_{0.40})PO_4$ | 230.1 | 254.2 |
|  | #2-7 | $(Lu_{0.40}Sc_{0.10}Al_{0.50})PO_4$ | 231.7 | 223.3 |
|  | #2-8 | $(Lu_{0.30}Sc_{0.10}Al_{0.60})PO_4$ | 230.1 | 226.7 |
|  | #2-9 | $(Y_{0.90}Sc_{0.10})PO_4$ | 238.9 | 275.7 |
|  | #2-10 | $(Y_{0.85}Sc_{0.10}Al_{0.05})PO_4$ | 238.9 | 289.4 |
|  | #2-11 | $(Y_{0.80}Sc_{0.10}Al_{0.10})PO_4$ | 238.1 | 312.4 |
|  | #2-12 | $(Y_{0.70}Sc_{0.10}Al_{0.20})PO_4$ | 238.1 | 293.6 |
|  | #2-13 | $(Y_{0.60}Sc_{0.10}Al_{0.30})PO_4$ | 238.1 | 280.5 |
|  | #2-14 | $(Y_{0.50}Sc_{0.10}Al_{0.40})PO_4$ | 238.1 | 294.8 |
|  | #2-15 | $(Y_{0.40}Sc_{0.10}Al_{0.50})PO_4$ | 238.1 | 310.6 |
| Comparative Example | #2-1 | $ScPO_4$ | 209.1 | 100.0 |

From the obtained result, it was confirmed that light of 228 nm to 239 nm peak wavelength in a deep ultraviolet region was obtained by vacuum ultraviolet excitation. Extremely intensive light emission was confirmed particularly from the phosphor composed of the phosphate containing at least two metal elements selected from the group consisting of group 13 elements and lanthanoid series elements. On the other hand, as shown in Comparative Example 2-1, extremely weak light emission was only obtained from the phosphor composed of the phosphate containing only one metal element. From these results, it was confirmed that more intensive light emission as compared with the conventional phosphor was obtained in Examples.

As Comparative Example 3 (Comparative Example 3-1), a scandium oxide (Sc2O3) and a diammonium hydrogenphosphate ((NH4)2HPO4) were used as raw materials. Each raw material was taken at a weight described in the table below and mixed using the mortar for 30 minutes, and then the mixture was filled in the alumina crucible. Calcination was performed at 1300° C. for 2 hours under atmosphere. After calcination, the obtained mixture was grinded using the mortar, washed with pure water, and then dried to obtain a phosphor.

The compositions of these raw materials are shown in detail below.

TABLE 5

|  |  |  | Measured value | | | | | | |
|---|---|---|---|---|---|---|---|---|---|
|  |  | Composition | Lu2O3 g | Nd2O3 g | Al2O3 g | Ga2O3 g | Sc2O3 g | (NH4)2HPO4 g | LiF g |
| Example | #3-1 | $(Lu_{0.999}Nd_{0.001})PO4$ | 13.9430 | 0.0119 | — | — | — | 10.2922 | 0.3635 |
|  | #3-2 | $(Lu_{0.995}Nd_{0.005})PO4$ | 13.8871 | 0.0594 | — | — | — | 10.2922 | 0.3635 |
|  | #3-3 | $(Lu_{0.990}Nd_{0.010})PO4$ | 13.8174 | 0.1187 | — | — | — | 10.2922 | 0.3635 |
|  | #3-4 | $(Lu_{0.970}Nd_{0.030})PO4$ | 13.5382 | 0.3651 | — | — | — | 10.2922 | 0.3635 |

TABLE 5-continued

| | | Composition | Measured value | | | | | | |
|---|---|---|---|---|---|---|---|---|---|
| | | | Lu2O3 g | Nd2O3 g | Al2O3 g | Ga2O3 g | Sc2O3 g | (NH4)2HPO4 g | LiF g |
| | #3-5 | $(Lu_{0.950}Nd_{0.050})PO_4$ | 13.2591 | 0.5936 | — | — | — | 10.2922 | 0.3635 |
| | #3-6 | $(Lu_{0.900}Nd_{0.100})PO_4$ | 12.5612 | 1.1872 | — | — | — | 10.2922 | 0.3635 |
| | #3-7 | $(Lu_{0.700}Nd_{0.300})PO_4$ | 9.7699 | 3.5615 | — | — | — | 10.2922 | 0.3635 |
| | #3-8 | $(Lu_{0.500}Nd_{0.500})PO_4$ | 6.9785 | 5.9358 | — | — | — | 10.2922 | 0.3635 |
| | #3-9 | $(Lu_{0.94}Nd_{0.05}Al_{0.01})PO_4$ | 13.1195 | 0.5936 | 0.0358 | — | — | 10.2922 | 0.3635 |
| | #3-10 | $(Lu_{0.90}Nd_{0.05}Al_{0.05})PO_4$ | 12.5612 | 0.5936 | 0.1788 | — | — | 10.2922 | 0.3635 |
| | #3-11 | $(Lu_{0.90}Nd_{0.05}Al_{0.10})PO_4$ | 11.8634 | 0.5936 | 0.3576 | — | — | 10.2922 | 0.3635 |
| Comparative Example | #3-1 | $ScPO_4$ | — | — | — | — | 5.5447 | 10.8912 | — |

(2) Identification of Phosphors

Figure 5A:
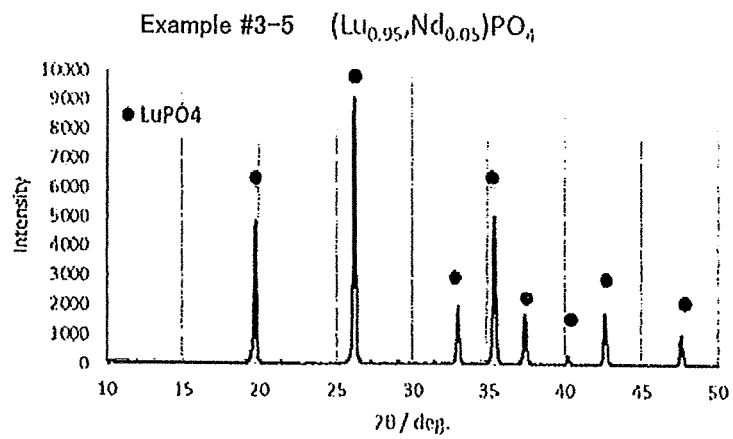
FIG. 5a shows the X-ray diffraction result of the phosphor according to Example 3-5 in the present disclosure.
Figure 5B:
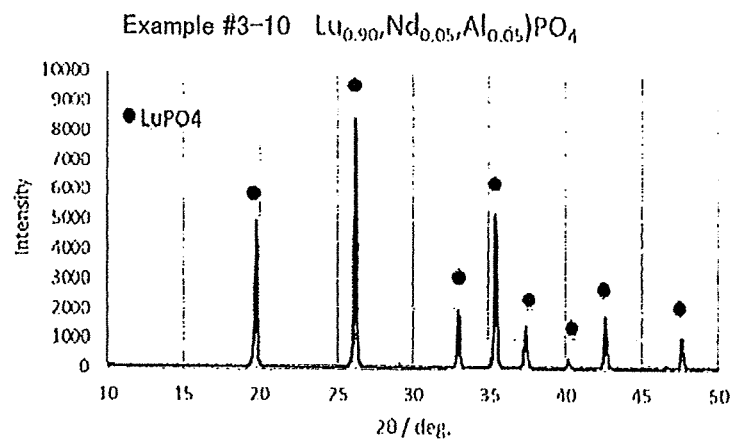
FIG. 5b shows the X-ray diffraction result of the phosphor according to Example 3-10 in the present disclosure.
Figure 5C:
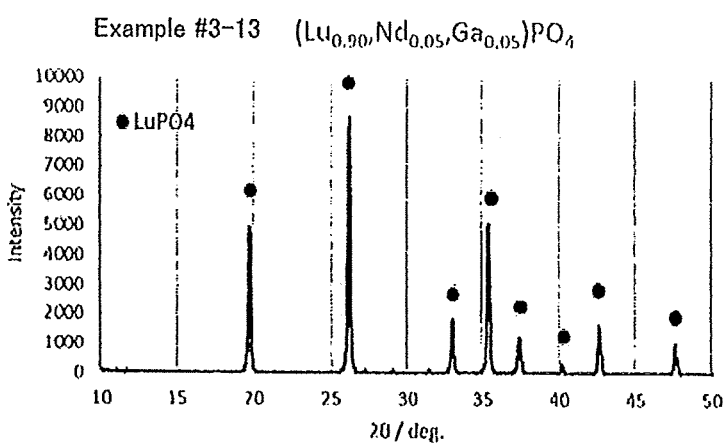
FIG. 5c shows the X-ray diffraction result of the phosphor according to Example 3-13 in the present disclosure.

X-ray diffraction result of the above-obtained phosphor was obtained by an X-ray diffractometer having a radiation source of CuKα. X-ray diffraction results of (Lu0.950Nd0.050)PO4 and (Lu0.900Nd0.050Al0.050)PO4 of the above-obtained phosphor samples are shown in FIGS. 5(a) to (c). From the X-ray diffraction pattern obtained, it was confirmed that any sample was definitely crystallized at compositions of (Lu, Al, Ga)1-xPO4:Ndx (0.005≤x≤0.10).

(3) Measurement of Emission Intensity

Figure 6:
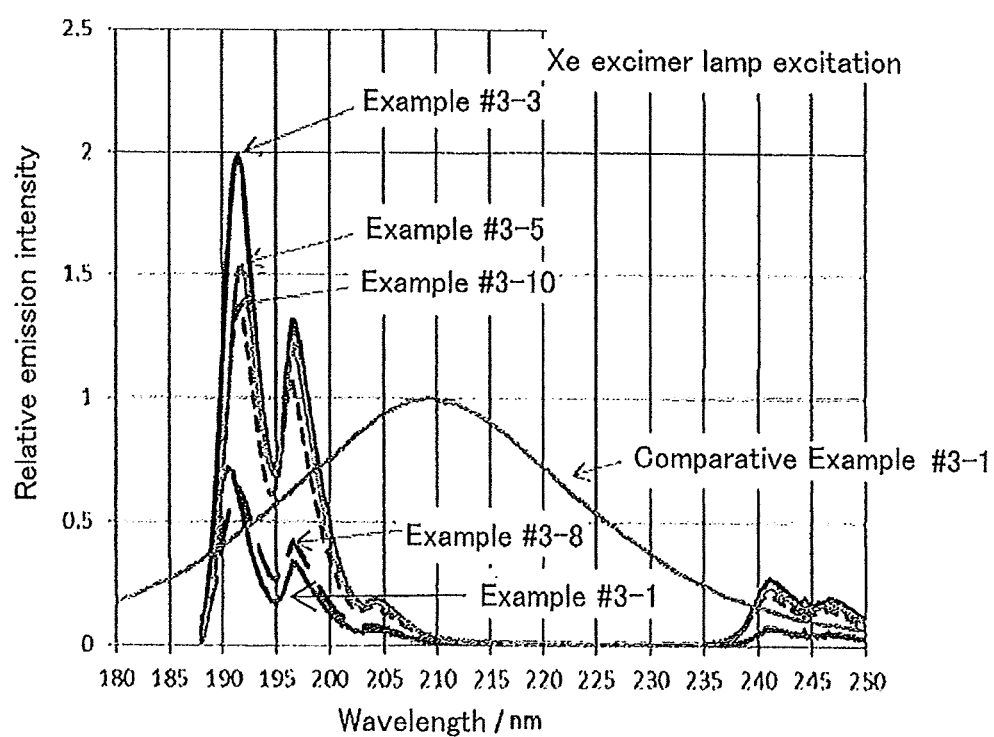
FIG. 6 shows the result of emission intensity from vacuum ultraviolet excitation of the phosphor according to Example 3 in the present disclosure.
Figure 7A:
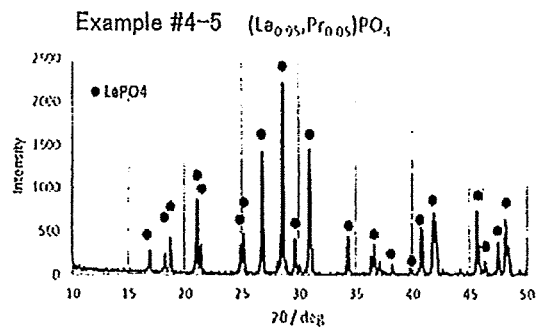
FIG. 7a shows the X-ray diffraction result of the phosphor according to Example 4-5 in the present disclosure.
Figure 7B:
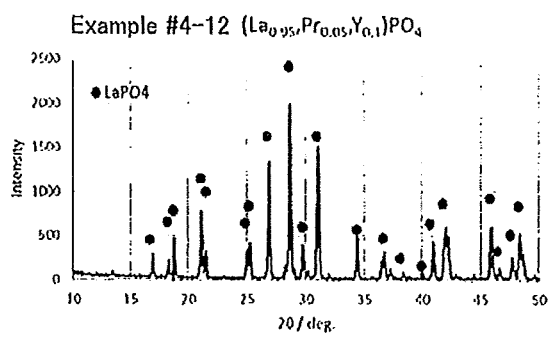
FIG. 7b shows the X-ray diffraction result of the phosphor according to Example 4-12 in the present disclosure.
Figure 7C:
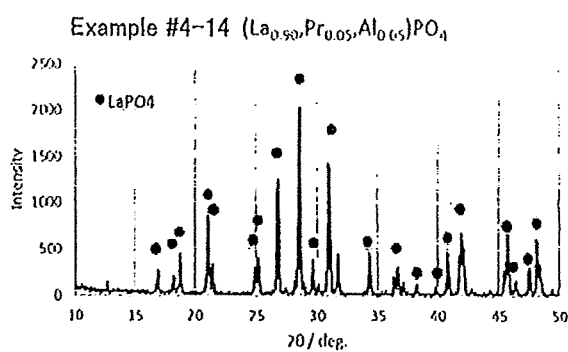
FIG. 7c shows the X-ray diffraction result of the phosphor according to Example 4-14 in the present disclosure.
Figure 7D:
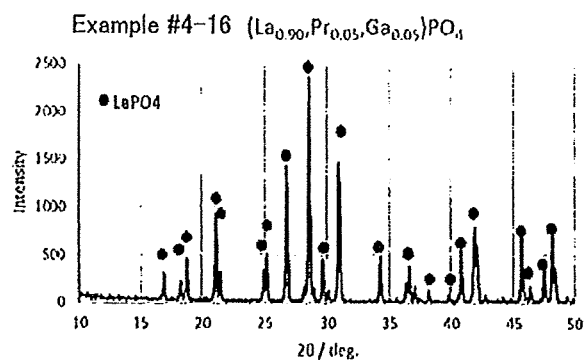
FIG. 7d shows the X-ray diffraction result of the phosphor according to Example 4-16 in the present disclosure.

With respect to phosphor samples of (Lu, Al, Ga)1-xPO4: Ndx (where 0.005≤x≤0.10) obtained in Example 3-1 to Example 3-11, the emission intensity from vacuum ultraviolet excitation by a Xe excimer lamp (wavelength λ=172 nm) was checked with Comparative Example 3-1. The obtained results are shown in the table below and some emission spectrums are shown in FIG. 6. The numerical value of each peak intensity in the table below is reduced one based on the numerical value of the peak intensity in Comparative Example 3-1 set at the standard value 100.

From the light emission wavelength characteristics of the obtained ultraviolet light, it was confirmed that the phosphors of Example 3 can be applied to applications of organic matter decomposition, ozone generation, OH radical generation, Low-k insulating film formation, resin curing, and sterilization and pasteurization, and can be utilized as an excellent mercury-free lamp.

(Example 4) (FIGS. 7a, 7b, 7c, 7d, 8a, 8b)

(1) Manufacturing a Phosphor

As Example 4 (Example 4-1 to Example 4-16), a lanthanum hydroxide (La(OH)3), a praseodymium oxide (Pr6O11), a diammonium hydrogenphosphate ((NH4)2HPO4), a lutetium oxide (Lu2O3), an yttrium oxide ($Y_2O_3$), an aluminum oxide ($Al_2O_3$), and a gallium oxide (Ga2O3) were used as raw materials, and a sodium chloride (NaCl) was used as a flux. Each substance was taken at a weight described in the table below and mixed using a mortar for 30 minutes, and then the mixture was filled in an alumina crucible. Calcination was performed at 950° C. for 2 hours under atmosphere. After calcination, the obtained

TABLE 6

| | | Cmposition | Emission peak wavelength nm | Emission peak intensity % |
|---|---|---|---|---|
| Example | #3-1 | $(Lu_{0.999}Nd_{0.001})PO_4$ | 1904 | 71.5 |
| | #3-2 | $(Lu_{0.995}Nd_{0.005})PO_4$ | 191.1 | 165.7 |
| | #3-3 | $(Lu_{0.990}Nd_{0.010})PO_4$ | 191.4 | 198.3 |
| | #3-4 | $(Lu_{0.970}Nd_{0.030})PO_4$ | 191.7 | 146.7 |
| | #3-5 | $(Lu_{0.950}Nd_{0.050})PO_4$ | 191.8 | 153.6 |
| | #3-6 | $(Lu_{0.900}Nd_{0.100})PO_4$ | 191.8 | 109.4 |
| | #3-7 | $(Lu_{0.700}Nd_{0.300})PO_4$ | 191.6 | 79.5 |
| | #3-8 | $(Lu_{0.500}Nd_{0.500})PO_4$ | 191.4 | 63.5 |
| | #3-9 | $(Lu_{0.940}Nd_{0.050}Al_{0.010})PO_4$ | 191.8 | 131.4 |
| | #3-10 | $(Lu_{0.900}Nd_{0.050}Al_{0.050})PO_4$ | 191.8 | 136.3 |
| | #3-11 | $(Lu_{0.900}Nd_{0.050}Al_{0.100})PO_4$ | 191.8 | 107.9 |
| Comparativa Example | #3-1 | $ScPO_4$ | 209.1 | 100.0 |

From the obtained result, it was confirmed that light of about 190 nm peak wavelength in a deep ultraviolet region was obtained by vacuum ultraviolet excitation. Extremely intensive light emission was confirmed particularly from the phosphor composed of the phosphate containing at least two metal elements selected from the group consisting of group 13 elements and lanthanoid series elements. On the other hand, as shown in Comparative Example 3-1, weak light emission was obtained from the phosphor composed of the phosphate containing only one metal element. From these results, it was confirmed that more intensive light emission as compared with the conventional phosphor was obtained in Examples.

mixture was grinded using the mortar, washed with pure water, and then dried to obtain a phosphor.

As Comparative Example 4 (Comparative Example 4-1), a scandium oxide (Sc2O3) and a diammonium hydrogenphosphate ((NH4)2HPO4) were used as raw materials. Each raw material was taken at a weight described in the table below and mixed using the mortar for 30 minutes, and then the mixture was filled in the alumina crucible. Calcination was performed at 1300° C. for 2 hours under atmosphere. After calcination, the obtained mixture was grinded using the mortar, washed with pure water, and then dried to obtain a phosphor.

The compositions of these raw materials are shown in detail below.

TABLE 7

|  |  | Composition | Measured value | | | | | | | | |
|---|---|---|---|---|---|---|---|---|---|---|---|
|  |  |  | La(OH)3 g | Pr6O11 g | Sc2O3 g | Lu2O3 g | Y2O3 g | Al2O3 g | Ga2O3 g | (NH4)2HPO4 g | NaCl g |
| Example | #4-1 | $(La_{0.999}Pr_{0.001})PO_4$ | 11.4644 | 0.0103 | — | — | — | — | — | 8.8219 | 10.5197 |
|  | #4-2 | $(La_{0.995}Pr_{0.005})PO_4$ | 11.4185 | 0.0513 | — | — | — | — | — | 8.8219 | 10.5197 |
|  | #4-3 | $(La_{0.990}Pr_{0.010})PO_4$ | 11.3612 | 0.1027 | — | — | — | — | — | 8.8219 | 10.5197 |
|  | #4-4 | $(La_{0.970}Pr_{0.030})PO_4$ | 11.1316 | 0.3080 | — | — | — | — | — | 8.8219 | 10.5197 |
|  | #4-5 | $(La_{0.950}Pr_{0.050})PO_4$ | 10.9021 | 0.5133 | — | — | — | — | — | 8.8219 | 10.5197 |
|  | #4-6 | $(La_{0.930}Pr_{0.070})PO_4$ | 10.6726 | 0.7186 | — | — | — | — | — | 8.8219 | 10.5197 |
|  | #4-7 | $(La_{0.900}Pr_{0.100})PO_4$ | 10.3283 | 1.0266 | — | — | — | — | — | 8.8219 | 10.5197 |
|  | #4-8 | $(La_{0.800}Pr_{0.200})PO_4$ | 9.1807 | 2.0531 | — | — | — | — | — | 8.8219 | 10.5197 |
|  | #4-9 | $(La_{0.700}Pr_{0.300})PO_4$ | 8.0331 | 3.0797 | — | — | — | — | — | 8.8219 | 10.5197 |
|  | #4-10 | $(La_{0.500}Pr_{0.400})PO_4$ | 6.8855 | 4.1063 | — | — | — | — | — | 8.8219 | 10.5197 |
|  | #4-11 | $(La_{0.850}Pr_{0.050}Lu_{0.100})PO_4$ | 9.7545 | 0.5133 | — | 1.1963 | — | — | — | 8.8219 | 10.5197 |
|  | #4-12 | $(La_{0.850}Pr_{0.050}Y_{0.100})PO_4$ | 9.7545 | 0.5133 | — | — | 0.6808 | — | — | 8.8219 | 10.5197 |
|  | #4-13 | $(La_{0.940}Pr_{0.050}Al_{0.010})PO_4$ | 10.7874 | 0.5133 | — | — | — | 0.0307 | — | 8.8219 | 10.5197 |
|  | #4-14 | $(La_{0.900}Pr_{0.050}Al_{0.050})PO_4$ | 10.3283 | 0.5133 | — | — | — | 0.1534 | — | 8.8219 | 10.5197 |
|  | #4-15 | $(La_{0.940}Pr_{0.050}Ga_{0.010})PO_4$ | 10.7874 | 0.5133 | — | — | — | — | 0.0565 | 8.8219 | 10.5197 |
|  | #4-16 | $(La_{0.900}Pr_{0.050}Ga_{0.050})PO_4$ | 10.3283 | 0.5133 | — | — | — | — | 0.2823 | 8.8219 | 10.5197 |
| Comparative Example | #4-1 | $ScPO_4$ | — | — | 5.5447 | — | — | — | — | 10.8912 | — |

(2) Identification of Phosphors

X-ray diffraction result of the above-obtained phosphor was obtained by an X-ray diffractometer having a radiation source of CuKα. X-ray diffraction results of (La0.950Pr0.050)PO4, (La0.850Pr0.050Y0.100)PO4, (La0.900Pr0.050Y0.050)PO4, and (La0.900Pr0.050Ga0.050)PO4 of the above-obtained phosphor samples are shown in FIGS. 7(a) to (d). From the obtained X-ray diffraction pattern, it was confirmed that any sample was definitely crystallized at compositions of (La, Lu, Y, Al, Ga)1-xPO4:Prx (0.005≤x≤0.20).

(3) Measurement of Emission Intensity

Figure 8A:
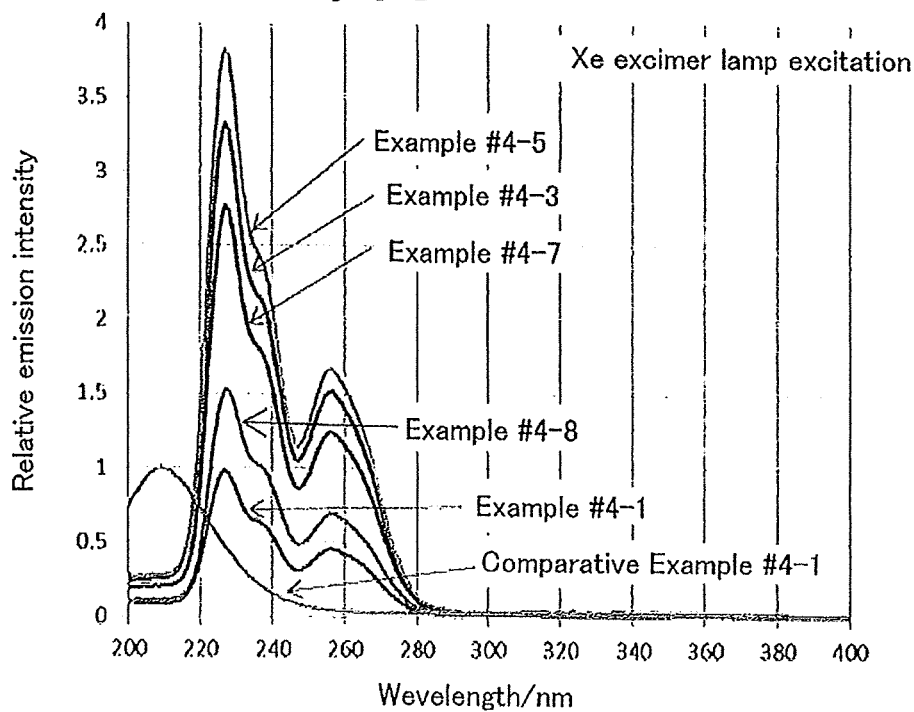
FIG. 8a shows the result of emission intensity from vacuum ultraviolet excitation of the phosphor according to Example 4 in the present disclosure.
Figure 8:
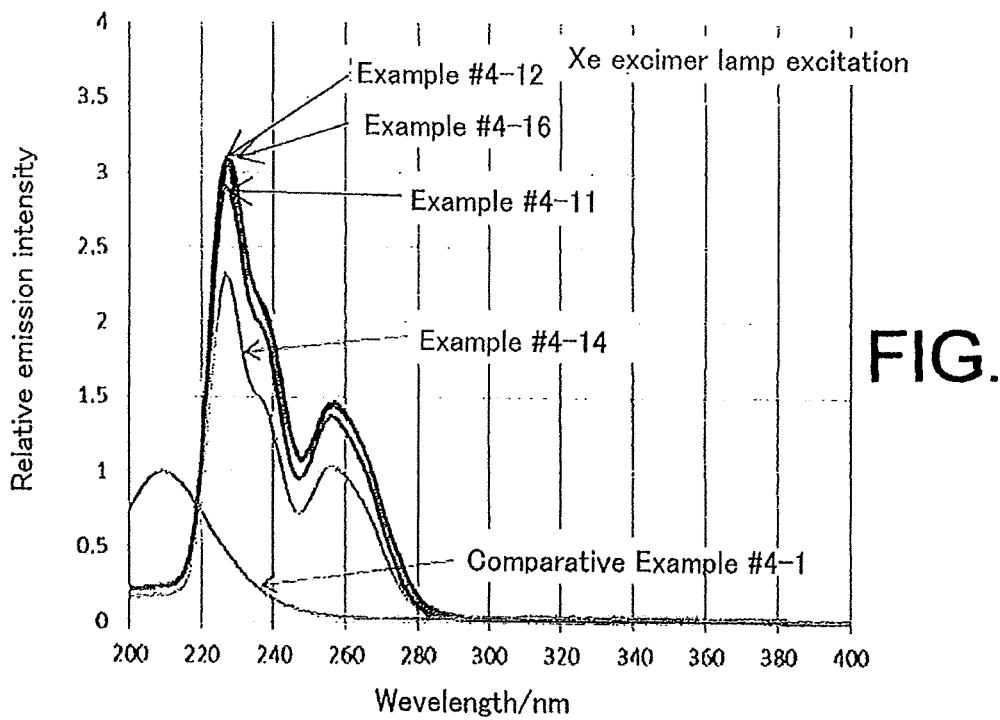
FIG. 8b shows the result of emission intensity from vacuum ultraviolet excitation of the phosphor according to Example 4 in the present disclosure.
Figure 10A:
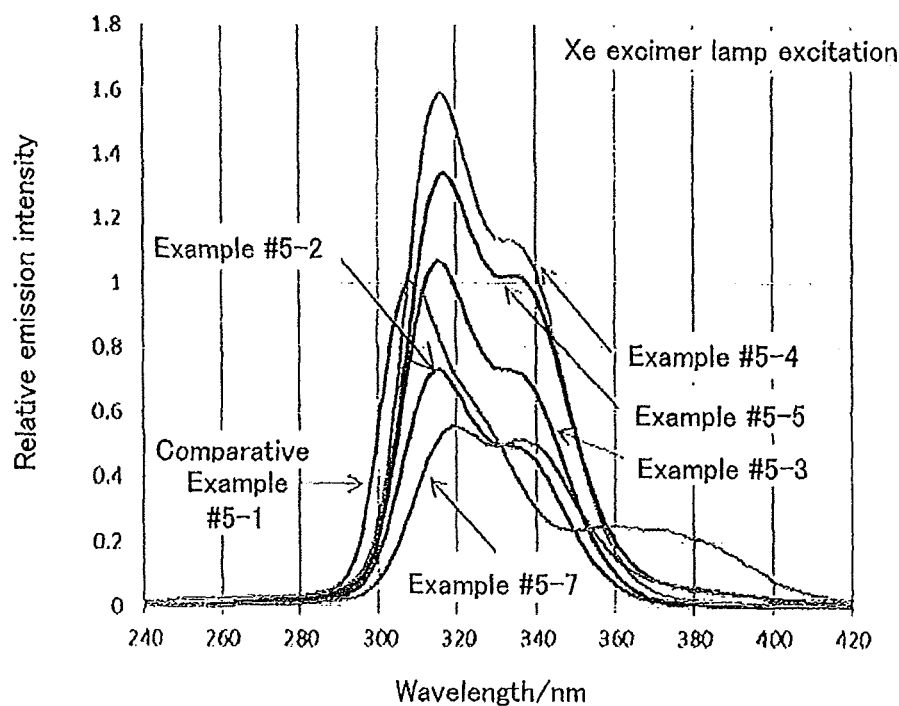
FIG. 10a shows the result of emission intensity from vacuum ultraviolet excitation of the phosphor according to Example 5 in the present disclosure.
Figure 10B:
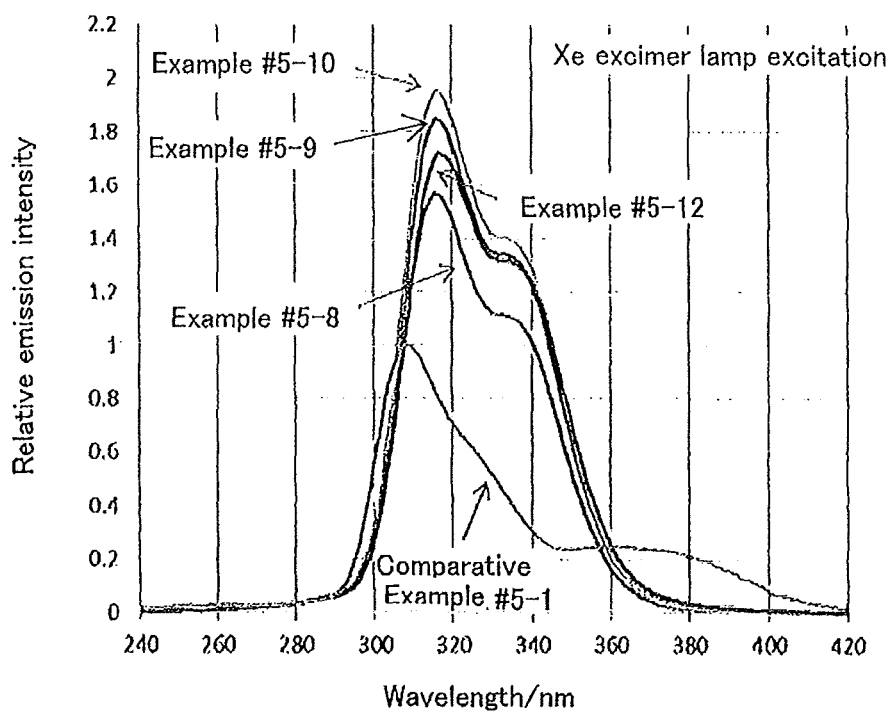
FIG. 10b shows the result of emission intensity from vacuum ultraviolet excitation of the phosphor according to Example 5 in the present disclosure.

With respect to phosphor samples having compositions of (La, Lu, Y, Al, Ga)1-xPO4:Prx (0.005≤x≤0.20) obtained in Example 4-1 to Example 4-16, the emission intensity from vacuum ultraviolet excitation by a Xe excimer lamp (wavelength λ=172 nm) was checked with Comparative Example 4-1. The obtained results are shown in the table below and some emission spectrums are shown in FIGS. 8(a) and (b). The numerical value of each peak intensity in the table below is reduced one based on the numerical value of the peak intensity in Comparative Example 4-1 set at the standard value 100.

From the obtained result, it was confirmed that light of about 227 nm peak wavelength in a deep ultraviolet region was obtained by vacuum ultraviolet excitation. Extremely intensive light emission was confirmed particularly from the phosphor composed of the phosphate containing at least two metal elements selected from the group consisting of group 13 elements and lanthanoid series elements. On the other hand, as shown in Comparative Example 4-1, extremely weak light emission was obtained from the phosphor composed of the phosphate containing only one metal element. From these results, it was confirmed that more intensive light emission as compared with the conventional phosphor was obtained in Examples.

From the light emission wavelength characteristics of the obtained ultraviolet light, it was confirmed that the phosphors of Example 4 can be applied to applications of organic matter decomposition, ozone generation, OH radical generation, Low-k insulating film formation, resin curing, and sterilization and pasteurization, and can be utilized as an excellent mercury-free lamp.

TABLE 8

|  |  | Composition | Emission peak wavelength nm | Emission peak intensity % |
|---|---|---|---|---|
| Example | #4-1 | $(La_{0.999}Pr_{0.001})PO_4$ | 226.9 | 97.8 |
|  | #4-2 | $(La_{0.995}Pr_{0.005})PO_4$ | 226.9 | 264.0 |
|  | #4-3 | $(La_{0.990}Pr_{0.010})PO_4$ | 226.9 | 332.2 |
|  | #4-4 | $(La_{0.970}Pr_{0.030})PO_4$ | 226.9 | 375.3 |
|  | #4-5 | $(La_{0.950}Pr_{0.050})PO_4$ | 226.9 | 382.4 |
|  | #4-6 | $(La_{0.930}Pr_{0.070})PO_4$ | 226.9 | 325.4 |
|  | #4-7 | $(La_{0.900}Pr_{0.100})PO_4$ | 226.9 | 276.9 |
|  | #4-8 | $(La_{0.800}Pr_{0.200})PO_4$ | 227.7 | 152.4 |
|  | #4-9 | $(La_{0.700}Pr_{0.300})PO_4$ | 227.7 | 86.9 |
|  | #4-10 | $(La_{0.600}Pr_{0.400})PO_4$ | 227.7 | 53.3 |
|  | #4-11 | $(La_{0.850}Pr_{0.050}Lu_{0.100})PO_4$ | 226.9 | 290.4 |
|  | #4-12 | $(La_{0.850}Pr_{0.050}Y_{0.100})PO_4$ | 227.7 | 308.5 |
|  | #4-13 | $(La_{0.940}Pr_{0.050}Al_{0.010})PO_4$ | 226.9 | 354.5 |
|  | #4-14 | $(La_{0.900}Pr_{0.050}Al_{0.050})PO_4$ | 226.9 | 231.5 |
|  | #4-15 | $(La_{0.940}Pr_{0.050}Ga_{0.010})PO_4$ | 226.9 | 367.5 |
|  | #4-16 | $(La_{0.900}Pr_{0.050}Ga_{0.050})PO_4$ | 226.9 | 308.6 |
| Comparative Example | #4-1 | $ScPO_4$ | 209.1 | 100.0 |

(Example 5) (FIGS. 9a, 9b, 10a, 10b)

(1) Manufacturing a Phosphor

As Example 5 (Example 5-1 to Example 5-13), a lanthanum hydroxide (La(OH)3), a cerium oxide (CeO2), a praseodymium oxide (Pr6O11), and a diammonium hydrogenphosphate ((NH4)2HPO4) were used as raw materials, and a sodium chloride (NaCl) was used as a flux. Each substance was taken at a weight described in the table below and mixed using a mortar for 30 minutes, and then the mixture was filled in an alumina crucible. Calcination was performed at 800° C. for 2 hours under reducing atmosphere of 20% hydrogen. After calcination, the obtained mixture was grinded using the mortar, washed with pure water, and then dried to obtain a phosphor.

As Comparative Example 5 (Comparative Example 5-1), a lutetium oxide (Lu2O3), a praseodymium oxide (Pr6O11), and an aluminum oxide ($Al_2O_3$) were used as raw materials, and a lithium fluoride (LiF) was used as a flux. Each substance was taken at a weight described in the table below and mixed using a mortar for 30 minutes, and then the mixture was filled in an alumina crucible. Calcination was performed at 1500° C. for 20 hours under reducing atmosphere of 20% hydrogen.

After calcination, the obtained mixture was grinded using the mortar, washed with pure water, and then dried to obtain a phosphor.

The compositions of these raw materials are shown in detail below.

(2) Identification of Phosphors

X-ray diffraction result of the above-obtained phosphor was obtained by an X-ray diffractometer having a radiation source of CuKα. X-ray diffraction results of (La0.800Ce0.200)PO4 and (La0.700Ce0.200Pr0.100)PO4 of the above-obtained phosphor samples are shown in FIGS. 9(a) and (b). From the X-ray diffraction pattern obtained, it was confirmed that each sample was definitely crystallized at compositions of La1-xPO4:Cex (0.05≤x≤0.50) and La1-x-yPO4:CexPry (0.05≤x≤0.50, 0.05≤y≤0.50).

(3) Measurement of Emission Intensity

With respect to samples of phosphors having compositions of La1-xPO4:Cex (0.05≤x≤0.50) obtained in Example 5-1 to Example 5-7 and phosphors having compositions of La1-x-yPO4:CexPry (0.05≤x≤0.50, 0.05≤y≤0.50) obtained in Example 5-8 to Example 5-13, the emission intensity from vacuum ultraviolet excitation by a Xe excimer lamp (wavelength λ=172 nm) was checked with Comparative Example 5-1. The obtained results are shown in the table below and some emission spectrums are shown in FIGS. 10 (a) and (b). The numerical value of each peak intensity in the table below is reduced one based on the numerical value of the peak intensity in Comparative Example 5-1 set at the standard value 100.

TABLE 9

| | | | Measured value | | | | | | | |
|---|---|---|---|---|---|---|---|---|---|---|
| | | Composition | La(OH)3 g | CeO2 g | Pr6O11 g | Lu2O3 g | Al2O3 g | (NH4)2HPO4 g | NaCl g | LiF g |
| Example | #5-1 | $(La_{0.995}Ce_{0.005})PO4$ | 11.4185 | 0.0516 | — | — | — | 8.8219 | 10.5197 | — |
| | #5-2 | $(La_{0.950}Ce_{0.050})PO4$ | 10.9021 | 0.5164 | — | — | — | 8.8219 | 10.5197 | — |
| | #5-3 | $(La_{0.900}Ce_{0.100})PO4$ | 10.3283 | 1.0328 | — | — | — | 8.8219 | 10.5197 | — |
| | #5-4 | $(La_{0.800}Ce_{0.200})PO4$ | 9.1807 | 2.0656 | — | — | — | 6.8219 | 10.5197 | — |
| | #5-5 | $(La_{0.700}Ce_{0.300})PO4$ | 8.0331 | 3.0984 | — | — | — | 8.8219 | 10.5197 | — |
| | #5-6 | $(La_{0.500}Ce_{0.500})PO4$ | 5.7380 | 5.1640 | — | — | — | 8 8219 | 10.5197 | — |
| | #5-7 | $(La_{0.400}Ce_{0.600})PO4$ | 4.5904 | 6.1968 | — | — | — | 8.8219 | 10.5197 | — |
| | #5-8 | $(La_{0.790}Ce_{0.200}Pr_{0.010})PO4$ | 9.0660 | 2.0656 | 0.1027 | — | — | 8.8219 | 10.5197 | — |
| | #5-9 | $(La_{0.750}Ce_{0.200}Pr_{0.050})PO4$ | 8.6069 | 2 0656 | 0.5133 | — | — | 8 8219 | 10.5197 | — |
| | #5-10 | $(La_{0.700}Ce_{0.200}Pr_{0.100})PO4$ | 8.0331 | 2.0656 | 1.0266 | — | — | 8.8219 | 10.5197 | — |
| | #5-11 | $(La_{0.600}Ce_{0.200}Pr_{0.200})PO4$ | 6.8855 | 2.0656 | 2.0531 | — | — | 8.8219 | 10.5197 | — |
| | #5-12 | $(La_{0.500}Ce_{0.200}Pr_{0.300})PO4$ | 5.7380 | 2 0656 | 3.0797 | — | — | 8.8219 | 10.5197 | — |
| | #5-13 | $(La_{0.300}Ce_{0.200}Pr_{0.500})PO4$ | 3.4428 | 2.0656 | 5.1328 | — | — | 8.8219 | 10.5197 | — |
| Comparative Example | #5-1 | $(Lu_{2.98}Pr_{0.02})Al_5O_{12}$ | — | — | 0.1027 | 17.8250 | 7.6632 | — | — | 0.3895 |

TABLE 10

| | | Composition | Emission peak wavelength nm | Emission peak intensity % |
|---|---|---|---|---|
| Example | #5-1 | $(La_{0.995}Ce_{0.005})PO_4$ | 315.0 | 14.5 |
| | #5-2 | $(La_{0.950}Ce_{0.050})PO_4$ | 315.8 | 72.9 |
| | #5-3 | $(La_{0.900}Ce_{0.100})PO_4$ | 315.0 | 106.6 |
| | #5-4 | $(La_{0.800}Ce_{0.200})PO_4$ | 315.8 | 158.7 |
| | #5-5 | $(La_{0.700}Ce_{0.300})PO_4$ | 316.6 | 134.0 |
| | #5-6 | $(La_{0.500}Ce_{0.500})PO_4$ | 319.8 | 105.2 |
| | #5-7 | $(La_{0.400}Ce_{0.600})PO_4$ | 319.0 | 55.5 |
| | #5-8 | $(La_{0.790}Ce_{0.200}Pr_{0.010})PO_4$ | 315.8 | 156.7 |
| | #5-9 | $(La_{0.750}Ce_{0.200}Pr_{0.050})PO_4$ | 316.6 | 184.7 |
| | #5-10 | $(La_{0.700}Ce_{0.200}Pr_{0.100})PO_4$ | 316.6 | 195.4 |
| | #5-11 | $(La_{0.600}Ce_{0.200}Pr_{0.200})PO_4$ | 316.6 | 194.8 |
| | #5-12 | $(La_{0.500}Ce_{0.200}Pr_{0.300})PO_4$ | 316.6 | 171.9 |
| | #5-13 | $(La_{0.300}Ce_{0.200}Pr_{0.500})PO_4$ | 318.2 | 159.5 |
| Comparative Example | #5-1 | $(Lu_{2.98}Pr_{0.02})Al_5O_{12}$ | 307.8 | 100.0 |

From the obtained result, it was confirmed that light of 315 nm to 320 nm peak wavelength in an ultraviolet region was obtained by vacuum ultraviolet excitation. Extremely intensive light emission was confirmed particularly from the phosphor composed of the phosphate containing at least two metal elements selected from the group consisting of group 13 elements and lanthanoid series elements. On the other hand, only weak light emission was obtained from the phosphor composed of the conventional oxide shown in Comparative Example 5-1. From these results, it was confirm that more intensive light emission as compared with the conventional phosphor was obtained by containing the above metal elements in a phosphate at a particular ratio.

From the light emission wavelength characteristics of the obtained ultraviolet light, it was confirmed that the phosphors of Example 5 can be applied to applications of organic matter decomposition, ozone generation, OH radical generation, Low-k insulating film formation, resin curing, and sterilization and pasteurization, and can be utilized as an excellent mercury-free lamp.

The exemplary embodiment has been described with reference to the preferred embodiments. Obviously, modifications and alterations will occur to others upon a reading and understanding of the preceding detailed description. It is intended that the exemplary embodiment be construed as including all such modifications and alterations insofar as they come within the scope of the above described embodiments and appended claims or the equivalents thereof.

The invention claimed is:

1. An ultraviolet light emitting phosphor selected from the group consisting of:
   (i) $((Lu)_{1-x-y}(Al,Ga)_y)PO_4:Sc_x$, wherein $0.005 \leq x \leq 0.80$ and $0.05 \leq y \leq 0.6$;
   (ii) $La_{1-x-y}PO_4:Ce_xPr_y$, wherein $0.005 \leq x \leq 0.50$ and $0.05 \leq y \leq 0.50$; and
   (iii) $((Lu)_{1-x-y}(Al,Ga)_y)PO_4:Nd_x$, wherein $0.001 \leq x \leq 0.10$ and $0.010 \leq y \leq 0.100$.

2. A light emitting element comprising the ultraviolet light emitting phosphor according to claim 1.

3. A light emitting device comprising the light emitting element according to claim 2.

4. The ultraviolet light emitting phosphor of claim 1, wherein the phosphor is (i) $((Lu)_{1-x-y}(Al,Ga)_y)PO_4:Sc_x$, wherein $0.005 \leq x \leq 0.80$ and $0.05 \leq y \leq 0.6$.

5. An ultraviolet light emitting phosphor of the formula: $(Al,Ga)_{1-x}PO_4:Sc_x$, wherein $0.005 \leq x \leq 0.80$.

6. The ultraviolet light emitting phosphor of claim 1, wherein the phosphor is (ii) $La_{1-x-y}PO_4:Ce_xPr_y$, wherein $0.005 \leq x \leq 0.50$ and $0.05 \leq y \leq 0.50$.

7. The ultraviolet light emitting phosphor of claim 1, wherein the phosphor is (iii) $((Lu)_{1-x-y}(Al,Ga)_y)PO_4:Nd_x$, wherein $0.001 \leq x \leq 0.10$ and $0.010 \leq y \leq 0.100$.

8. A light emitting device comprising the ultraviolet light emitting phosphor of claim 4.

9. The light emitting device of claim 8, wherein the light emitting device is a sterilization lamp.

10. A light emitting device comprising the ultraviolet light emitting phosphor of claim 6.

11. The light emitting device of claim 10, wherein the light emitting device is a sterilization lamp.

12. A light emitting device comprising the ultraviolet light emitting phosphor of claim 7.

13. The ultraviolet light emitting phosphor of claim 4, wherein $0.1 \leq y \leq 0.6$.

14. The ultraviolet light emitting phosphor of claim 4, wherein $0.2 \leq y \leq 0.6$.

15. The ultraviolet light emitting phosphor of claim 4, wherein $0.3 \leq y \leq 0.6$.

16. The ultraviolet light emitting phosphor of claim 4, wherein $0.4 \leq y \leq 0.6$.

17. The ultraviolet light emitting phosphor of claim 4, wherein $0.5 \leq y \leq 0.6$.

18. The ultraviolet light emitting phosphor of claim 7, wherein $0.050 \leq y \leq 0.10$.

19. A light emitting device comprising the ultraviolet light emitting phosphor of claim 5.

20. The light emitting device of claim 19, wherein the light emitting device is a sterilization lamp.

* * * * *